United States Patent
Hovanky et al.

(10) Patent No.: US 7,583,289 B2
(45) Date of Patent: Sep. 1, 2009

(54) OPTICAL BLOCK ASSEMBLY

(75) Inventors: Thao D. Hovanky, Austin, TX (US); Richard G. Washington, Marble Falls, TX (US)

(73) Assignee: GE Security, Inc., Bradenton, FL (US)

( * ) Notice: Subject to any disclaimer, the term of this patent is extended or adjusted under 35 U.S.C. 154(b) by 912 days.

(21) Appl. No.: 10/732,193

(22) Filed: Dec. 10, 2003

(65) Prior Publication Data

US 2004/0183907 A1 Sep. 23, 2004

Related U.S. Application Data

(60) Provisional application No. 60/437,690, filed on Jan. 2, 2003.

(51) Int. Cl.
*H04N 7/18* (2006.01)
*H04N 9/47* (2006.01)

(52) U.S. Cl. .................................................. 348/61

(58) Field of Classification Search ................. None
See application file for complete search history.

(56) References Cited

U.S. PATENT DOCUMENTS

| | | | |
|---|---|---|---|
| 3,958,257 | A | 5/1976 | Johnson |
| 3,972,056 | A | 7/1976 | Tsujimoto et al. |
| 4,192,591 | A | 3/1980 | Yobaccio |
| 4,386,823 | A | 6/1983 | Musha |
| 4,404,595 | A | 9/1983 | Ushiro et al. |
| 4,482,986 | A | 11/1984 | Noda et al. |
| 4,658,390 | A | 4/1987 | Fujii et al. |
| 4,845,411 | A | 7/1989 | Smith |
| 4,885,600 | A | 12/1989 | Iwasa et al. |
| 5,016,993 | A | 5/1991 | Akitake |
| 5,034,837 | A | 7/1991 | Schmitz |
| 5,060,001 | A | 10/1991 | Kaneda |
| 5,144,491 | A | 9/1992 | Ushiro et al. |
| 5,191,470 | A | 3/1993 | Wickholm et al. |
| 5,200,776 | A | 4/1993 | Sakamoto |
| 5,289,318 | A | 2/1994 | Sekine et al. |
| 5,352,882 | A | 10/1994 | Koyanagi et al. |
| 5,387,936 | A | 2/1995 | Katsumoto |

(Continued)

FOREIGN PATENT DOCUMENTS

JP 10186203 A 7/1998

(Continued)

OTHER PUBLICATIONS

International Search Report, PCT/US03/39082, 6 pgs.

(Continued)

*Primary Examiner*—Nhon T Diep
(74) *Attorney, Agent, or Firm*—Global Patent Operation

(57) ABSTRACT

Optical block assemblies having single or multi-stage folded light path lens assemblies that may be implemented to allow an optical block assembly to occupy significantly less space and/or present reduced rotational inertia to an electrical articulating mechanism. An optical assembly may be so configured for closed circuit television applications or in any other suitable video imaging application including, but not limited to, applications involving non-articulated or articulated cameras such as normal filming (e.g., motion picture film cameras or studio television cameras), camcorders, military targeting or imaging devices, etc.

60 Claims, 10 Drawing Sheets

U.S. PATENT DOCUMENTS

| | | | |
|---|---|---|---|
| 5,396,367 | A | 3/1995 | Ono et al. |
| 5,737,644 | A | 4/1998 | Nomura et al. |
| 5,748,995 | A | 5/1998 | Kitagawa et al. |
| 5,838,374 | A | 11/1998 | Kikuchi |
| 5,943,169 | A | 8/1999 | Okada |
| 5,986,821 | A | 11/1999 | Yoon |
| 5,995,299 | A | 11/1999 | Yoon |
| 6,011,659 | A | 1/2000 | Onda |
| 6,172,709 | B1 | 1/2001 | Yamano et al. |
| 6,262,768 | B1 * | 7/2001 | Williams ............... 348/217.1 |
| 6,322,258 | B1 | 11/2001 | Ryan et al. |
| 6,498,564 | B2 | 12/2002 | Oda |
| 6,507,366 | B1 | 1/2003 | Lee |
| 6,563,648 | B2 | 5/2003 | Gleckman et al. |
| 6,574,050 | B1 * | 6/2003 | Lin et al. ............... 359/668 |
| 6,747,686 | B1 | 6/2004 | Bennett |
| 6,856,469 | B2 | 2/2005 | Yoneyama et al. |
| 2002/0014577 | A1 | 2/2002 | Ulrich et al. |
| 2003/0117342 | A1 * | 6/2003 | Ebersole et al. ............... 345/8 |
| 2005/0219152 | A1 * | 10/2005 | Budd et al. ............... 345/8 |

FOREIGN PATENT DOCUMENTS

JP          02000321475 A      11/2000

OTHER PUBLICATIONS

U.S. Appl. No. 10/732740, filed Dec. 10, 2003, "Systems And Methods For Actuating Lens Assemblies".

Ferro Tec USA, Domain Detection, http:/www.ferrotec.com/usa/domain_detection.htm, 2 pgs., printed off Internet on Dec. 5, 2003, and labeled "© 2001-2003".

Ferro Tec USA, Ferrofluid Technology Overview, http:/www.ferrotec.com/usa/ferrofluid_technology_overview, 3 pgs., printed off Internet on Dec. 5, 2003, and labeled "© 2001-2003".

Ferro Tec USA, Optical Pick Ups, http:/www.ferrotec.com/usa/optical_pickups.htm, 2 pgs., printed off Internet on Dec. 5, 2003, and labeled "© 2001-2003".

Ferro Tec USA, Other Applications, http:/www.ferrotec.com/usa/other_applications.htm, 2 pgs., printed off Internet on Dec. 5, 2003, and labeled "© 2001-2003".

Ferro Tec USA, Educational Kits, http:/www.ferrotec.com/usa/educational_kits.htm, 2 pgs., printed off Internet on Dec. 5, 2003, and labeled "© 2001-2003".

Ferro USA Corporation, Company profile, http:/www.avem.org/MemDirF/Ferro.html, 2 pgs., printed off Internet on Dec. 5, 2003.

Nikon, New Eclipse E200, Biological Microscope, Jan. 2000, 2 pgs.

Zoom Lens, L. G. Electronics, Korea, Sep. 8, 1996, 1 pg.

Sony "Color Camera Module, FCB-IX47/IX47P, FCB-IX470/IX470P", 1999, 4 pgs.

Ferrofluids Exclusion Seal Applications Manual, 1987, 14 pgs.

* cited by examiner

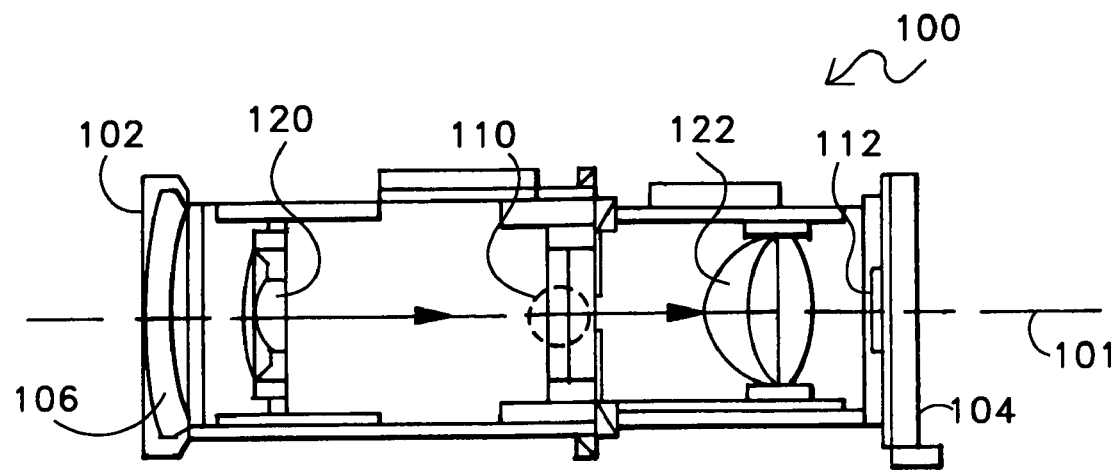
FIG. 1-Prior Art
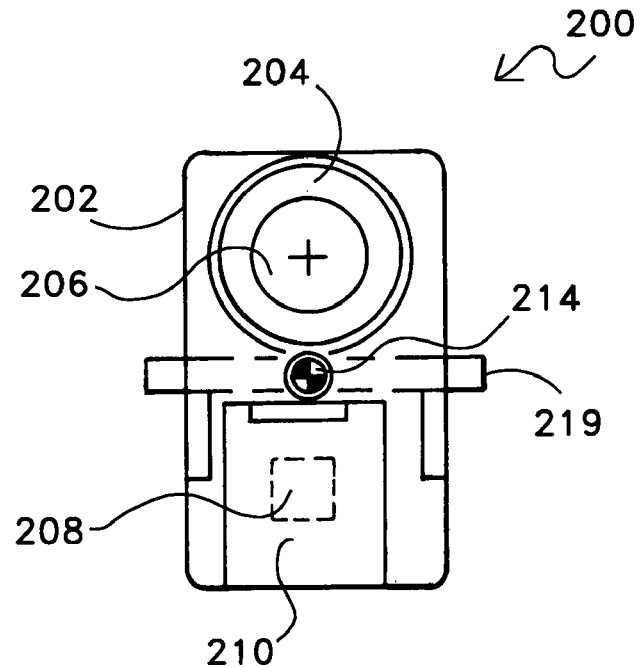
FIG. 2B

OPTICAL BLOCK ASSEMBLY

This patent application claims priority to copending U.S. Provisional Patent Application Serial No. 60/437,690, filed Jan. 2, 2003, and entitled "OPTICAL BLOCK ASSEMBLY" by Hovanky et al., the entire disclosure of which is incorporated herein by reference.

BACKGROUND OF THE INVENTION

The present invention relates generally to optical block assemblies, and more particularly to folded light path optical block assemblies.

Existing optical blocks for video cameras, such as closed circuit television ("CCTV) cameras, use a single linear optical path for light to enter the image sensor. For example, existing closed circuit television ("CCTV") camera optical blocks are based on consumer electronics grade camcorder technology. In this technology, the image sensors are generally in the ⅓" or ¼" formats and the corresponding video format is of standard 768×494 pixel resolution for NTSC video signal format and 752×582 pixel resolution for PAL video signal format. A typical linear optical assembly 100 for existing CCTV products is shown in FIG. 1. As illustrated in FIG. 1, linear optical assembly 100 has a lens end 102 that includes a front lens 106, and a sensor end 104 that includes an image sensor 112 for receiving light gathered by lens 106. Also shown are zoom and focus lenses 120 and 122. The linear optical block configuration of assembly 100 forms a single linear optical path having a single longitudinal axis 101 between lens 106 and sensor 108. Linear optical assembly 100 is configured to swivel about a point 110, which is positioned near the center of gravity of linear assembly 100, to pan or tilt the assembly. Drawbacks associated with the configuration of such existing optical blocks include limitations on image sensor size, and rotational inertia associated with longer optical blocks and increased rotational speeds.

As image sensor resolution increases, the size of the sensor will typically increase. For example, typical CCTV resolution sensors have resolutions of 768×494 or 752×582 and have a diagonal size of either ¼" or ⅓". However, as resolutions increase to 1280×720 and beyond (e.g., to full High Definition Television—"HDTV" resolution), the image sensor size increases to the ½" to ⅔" range. This increase in size is due to the requirement to maintain overall sensitivity of the image element which is a function of size and light gathering capability. This sensitivity issue is most pronounced in camera applications where low light conditions are routinely encountered. While the linear arrangement of internal optical components may be acceptable for standard analog video resolutions, it is not possible to accommodate larger image sensors sizes without elongating the optical lens assembly. Extension of the optical block to accommodate larger sensor sizes results in larger housings, for example, requiring larger CCTV dome enclosures to house the optical block.

As the length of the optical block increases the rotational inertia required to pan and tilt the assembly also increase. This is true even if the optical block pivots at its center of gravity. This increased rotational inertia results in decreased efficiency from an electro-mechanical drive perspective. This problem is accentuated when increased rotational or pivoting speeds are desired, e.g., as desired by the CCTV video surveillance industry.

SUMMARY OF THE INVENTION

Disclosed herein are optical block assemblies having single or multi-stage (e.g., having dual stage, having three or more stages, etc.) folded light path lens assemblies that may be advantageously implemented to allow an optical block assembly to occupy significantly less space and/or present reduced rotational inertia to an electrical articulating mechanism. In one embodiment, an optical assembly may be configured to result in a more energy efficient pan tilt zoom mechanism that fits into a smaller CCTV dome size. However, although the disclosed folded light path optical block assemblies may be implemented to provide unique advantages in CCTV applications, it will be understood that the disclosed assemblies may also be advantageously employed in any suitable video imaging application including, but not limited to, applications involving non-articulated or articulated cameras such as normal filming (e.g., motion picture film cameras or studio television cameras), camcorders, military targeting or imaging devices, etc.

In the implementation of one exemplary embodiment of the disclosed folded light path optical block assembly, light enters the optical block and then reflects or refracts off one or more primary prisms, mirrors or other suitable light bending component to introduce, for example, an angle of about 90 degrees or about 180 degrees onto the light path before entering the image sensor integrated assembly. By using this disclosed "periscopic" imaging technique in either single stage or multi-stage assembly configuration, the overall size of a zoom lens may be advantageously made more compact. Furthermore, the assembly may be configured to pivot about the center of gravity of the periscopic assembly, e.g., for articulated image device applications.

The disclosed folded light path optical block assemblies may be advantageously implemented in another exemplary embodiment to allow an entire lens optomechanical assembly to have low angular inertia such that motor drive power consumption in a pan/tilt/zoom ("PTZ") CCTV camera application is significantly reduced. In addition, the smaller package of the optical block of this exemplary embodiment may be configured to allow the entire camera to fit into existing industry standard enclosures, such as dome enclosures, which were designed to house conventional, linearly aligned optical lens assemblies. Examples of dome enclosures with which the folded light path optical block assemblies may be employed include, but are not limited to, spherical or semi-spherical dome enclosures having a diameter of less than or equal to about 10 inches, alternatively spherical or semi-spherical dome enclosures having a diameter of between about 4 inches and about 10 inches, alternatively spherical or semi-spherical dome enclosures having a diameter of from about 1 inch to about 4 inches, and further alternatively spherical or semi-spherical dome enclosures having a diameter of less than or equal to about 1 inch (e.g. in conjunction with micro camera image sensor).

Additionally or alternatively, the disclosed folded light path optical block may be employed to support high definition video imaging (e.g., 1280×720 pixel resolutions and greater, 1280×10$^{24}$ pixel resolutions and greater, HDTV format applications, etc.) on CCTV video camera applications. It will be understood that the disclosed folded light path optical block assemblies may be configured for use with a variety of image sensor sizes including, but not limited to, ⅓" and ¼" and smaller size formats as well as ½" and ⅔" and larger size formats.

In various embodiments of the disclosed folded light path optical block assemblies, a number of exemplary features may be advantageously implemented, alone or in combination, to achieve reduced rotational inertia of an optical block and/or reduced overall size of an optical block. Examples of such exemplary features include, but are not limited to, a dual prism/mirror and lens arrangement in which the center of gravity of the lens assembly is located on or near the center of rotation of the assembly; and a single prism arrangement in which the center of gravity of the lens assembly is located on or near the center of rotation of the assembly. In one exemplary embodiment, the center of gravity may also be characterized as being on, at or near the geometric center of a folded light path optical block assembly (e.g., single-stage or dual-stage folded light path optical block assembly), although this characteristic is not required to realize the benefits of the disclosed systems and methods.

In one respect, disclosed herein is an optical block for a closed circuit television camera, including a folded light path optical block assembly configured for use in a closed circuit television assembly.

In another respect, disclosed herein is a closed circuit television apparatus, including a folded light path optical block assembly. The folded light path optical block assembly may include a light gathering lens at a front end of the optical block assembly, a closed circuit television image sensor at a back end of the optical block assembly, and at least one light bending component operatively disposed to form an optical path between the light gathering lens and the image sensor. The light gathering lens, the image sensor, and the at least one light bending component may be disposed in a common geometric plane, and the folded light path optical block assembly may be configured to rotate within this common geometric plane.

In another respect, disclosed herein is an optical block assembly that includes a light gathering lens disposed at a front end of the assembly, the light gathering lens configured to gather and transmit light along an initial linear light path; and an image sensor disposed at a back end of the assembly, the image sensor configured to receive light transmitted along a terminal linear light path. One or more light bending components may be operatively disposed to form an optical path between the light gathering lens and the image sensor, each of the one or more light bending components configured to receive light transmitted along a first linear light path and to transmit the light along a second linear light path having a longitudinal axis that is different than the longitudinal axis of the first linear light path of the same light bending component. Each of the one or more light bending components forms a respective light bending point within the optical path between the light gathering lens and the image sensor. The one or more light bending components may thus be configured together in operative relationship with the light gathering lens and the image sensor to receive light transmitted from the light gathering lens along the initial linear light path, and to transmit the light along one or more successive linear light paths, the one or more successive linear light paths including the terminal linear light path to the image sensor. The folded light path optical block may be configured to rotate about at least one rotational axis, the at least one rotational axis intersecting a space having an outermost periphery defined between the one or more light bending points, the point of intersection of the longitudinal axis of the initial linear light paths with the front end of the assembly and the point of intersection of the longitudinal axis of the terminal linear light path with the back end of the assembly.

In another respect, disclosed herein is a method of operating an optical block for a closed circuit television camera, including providing a folded light path optical block assembly configured for use in a closed circuit television assembly, and rotating the folded light path optical block assembly about at least one rotational axis.

In another respect, disclosed herein is a method of operating an optical block assembly, including providing an optical block assembly, and rotating the optical block assembly about at least one rotational axis. The optical block assembly may include the following components: a light gathering lens disposed at a front end of the assembly, the light gathering lens configured to gather and transmit light along an initial linear light path; an image sensor disposed at a back end of the assembly, the image sensor configured to receive light transmitted along a terminal linear light path; and one or more light bending components operatively disposed to form an optical path between the light gathering lens and the image sensor, each of the one or more light bending components configured to receive light transmitted along a first linear light path and to transmit the light along a second linear light path having a longitudinal axis that is different than the longitudinal axis of the first linear light path of the same light bending component. Each of the one or more light bending components forms a respective light bending point within the optical path between the light gathering lens and the image sensor. The one or more light bending components may thus be configured together in operative relationship with the light gathering lens and the image sensor to receive light transmitted from the light gathering lens along the initial linear light path, and to transmit the light along one or more successive linear light paths, the one or more successive linear light paths including the terminal linear light path to the image sensor. The at least one rotational axis may intersect a space having an outermost periphery defined between the one or more light bending points, the point of intersection of the longitudinal axis of the initial linear light paths with the front end of the assembly and the point of intersection of the longitudinal axis of the terminal linear light path with the back end of the assembly.

BRIEF DESCRIPTION OF THE DRAWINGS

FIG. 1 is an illustration of a conventional linear optical block assembly.

FIG. 2B is a front cross sectional representation of a folded light path optical block assembly according to one exemplary embodiment disclosed herein.

DESCRIPTION OF ILLUSTRATIVE EMBODIMENTS

Figure 2A:
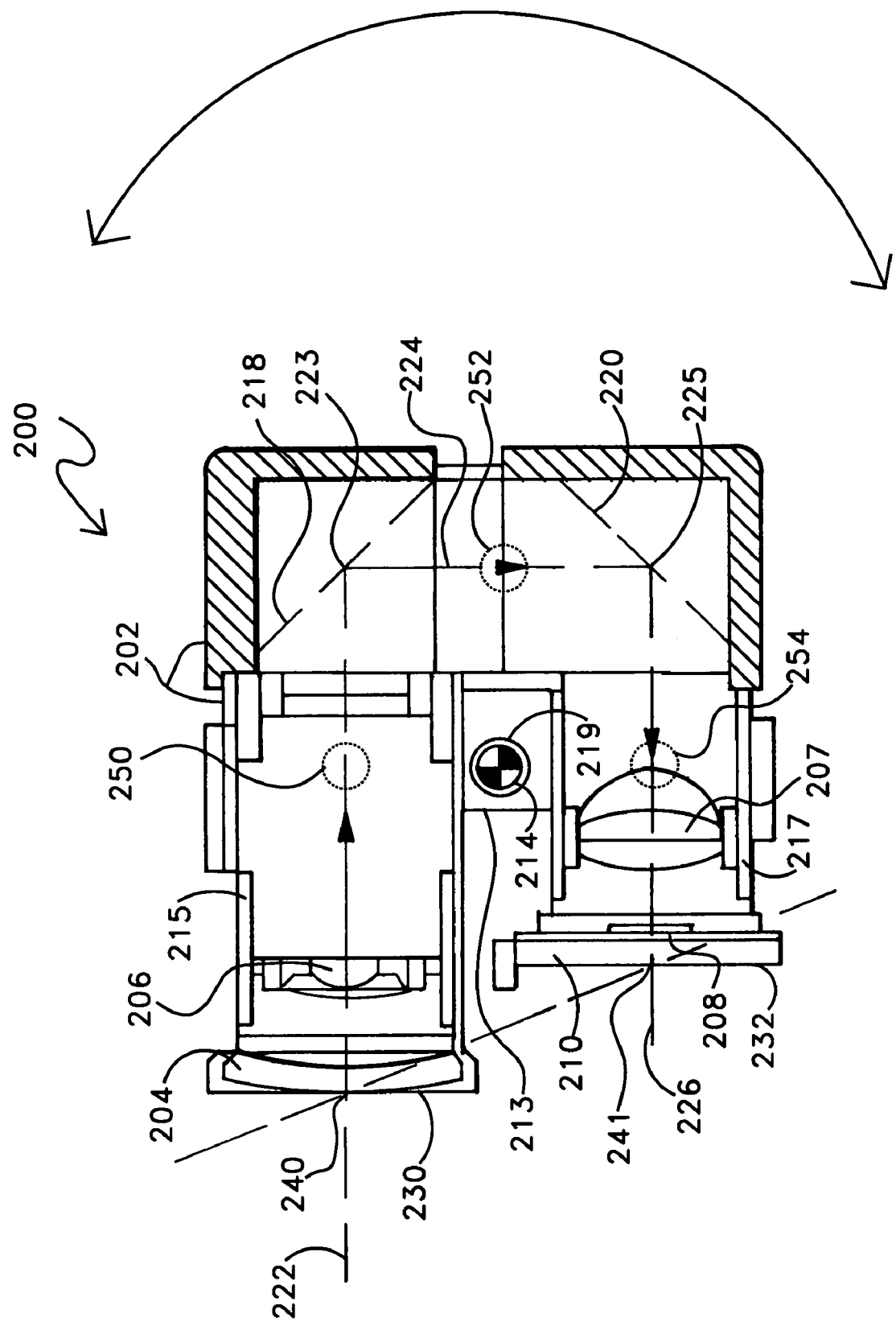
FIG. 2A is a side cross sectional representation of a folded light path optical block assembly according to one exemplary embodiment disclosed herein.
Figure 3A:
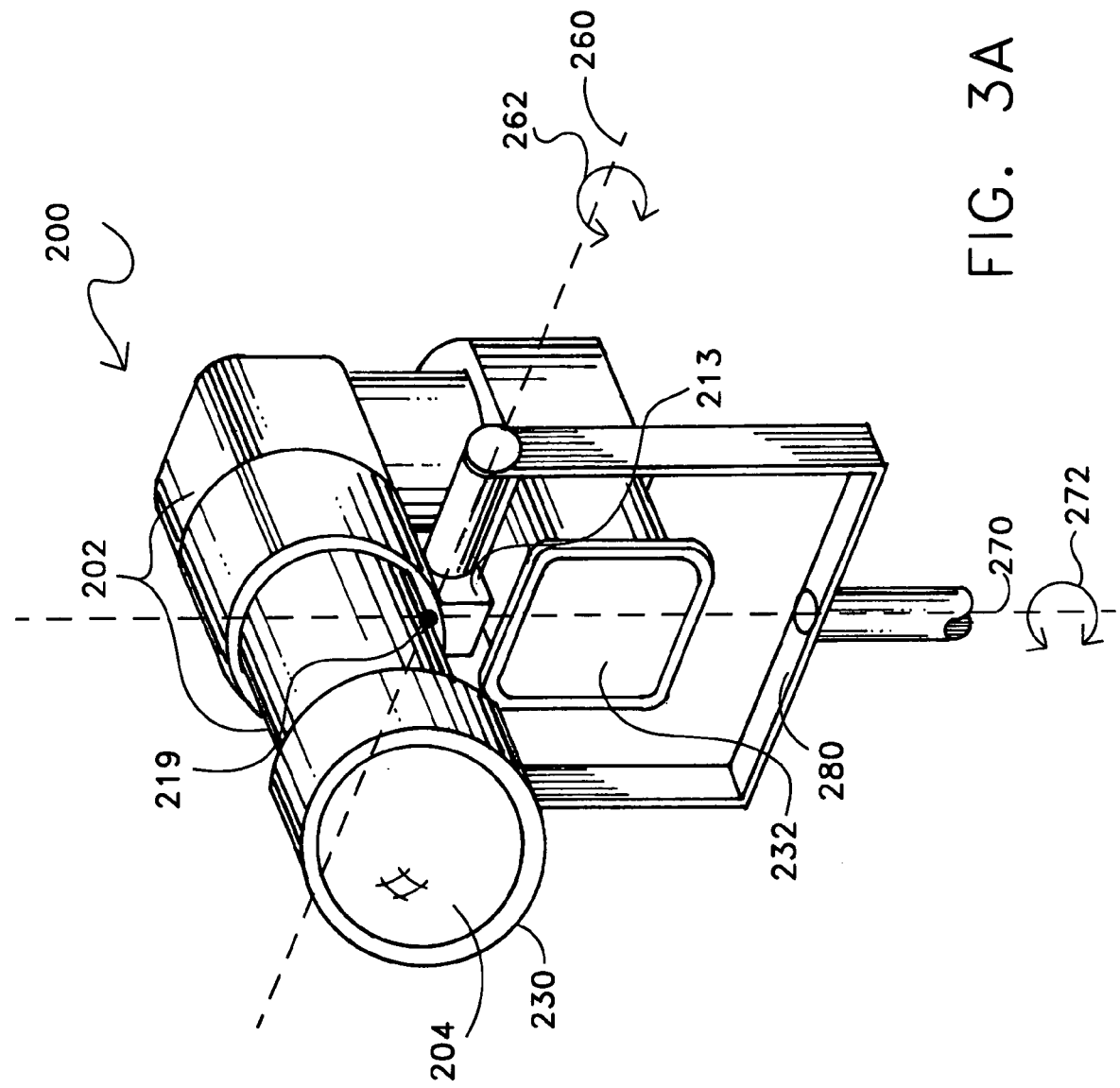
FIG. 3A is a perspective view of a folded light path optical block assembly according to one exemplary embodiment disclosed herein.

FIGS. 2A, 2B and 3A illustrate respective side, frontal and perspective views of one exemplary embodiment of a multiple stage folded light path optical block assembly according to the disclosed systems and methods. In this regard, FIGS. 2A, 2B and 3 illustrate a dual-stage folded light path optical block assembly 200 that includes an optical block housing 202 that maintains in operative relationship a pair of 90-degree reflecting prisms 218 and 220, a movable zoom lens assembly 206, a movable focus lens assembly 207 and image sensor circuit board assembly 210. As illustrated, prisms 218 and 220 are operatively disposed to form an optical path between a light or image gathering lens 204 and an image sensor 208 of assembly 200.

Still referring to FIGS. 2A, 2B and 3A, light gathering lens 204 is configured to provide a first or initial linear light path defined between light gathering lens 204 at front end 230 of assembly 200 and first 90-degree reflecting prism 218. As shown, the first or initial linear light path of assembly 200 extends through zoom lens assembly 206 and has a longitudinal axis 222. A first stage folded light path is provided by first 90-degree reflecting prism 218 that is configured to provide a second or intermediate linear light path between first 90-degree reflecting prism 218 and second 90-degree reflecting prism 220. As shown, the second or intermediate linear light path of assembly 200 has a longitudinal axis 224. A second stage folded light path is provided by second 90-degree reflecting prism 220 that is configured to provide a third or terminal linear light path between second 90-degree reflecting prism 220 and image sensor 208 positioned at back end 232 of assembly 200. As shown, the third or terminal linear light path of assembly 200 extends through focus lens assembly 207 and has a longitudinal axis 226. Also shown in FIG. 2A is lens drive mechanism 215 configured to actuate zoom lens group assembly 206, and lens drive mechanism 217 configured to actuate focus lens group assembly 207. Initial, intermediate, and terminal light paths of assembly 200 may be characterized as being disposed in a common plane, and the terminal light path of assembly 200 has a direction that is parallel and opposite to the direction of the initial light path so that the optical path of assembly 200 folds back upon itself.

Still referring to FIG. 2A, dual-stage folded light path optical block assembly 200 has a center of gravity 214 that is located within an area (i.e., an area of the plane defined by longitudinal axes 222, 224 and 226 of respective first, second and third linear light paths of assembly 200) having an outermost periphery defined between light bending points 223 and 225 (located at the respective intersections of adjacent longitudinal axes 222 and 224, and adjacent longitudinal axes 224 and 226 of linear light paths of assembly 200), and the point of intersection 240 of axis 222 with front end 230 and the point of intersection 241 of axis 226 with back end 232 of assembly 200. As further shown, assembly 200 of the illustrated exemplary embodiment is configured with a mounting bracket 213 that provides a pivot point 219 for assembly 200 that coincides with center of gravity 214 of assembly 200 so that the center of rotation of assembly 200 is located at the center of gravity of the lens assembly. In this way, bracket 213 may be employed to rotate assembly 200 around assembly pivot point 219 in the directional plane indicated by the arrow in FIG. 2A (i.e., rotated within a plane defined by longitudinal axes 222, 224 and 226 of respective first, second and third linear light paths of assembly 200) so that an optimum minimized angular moment of inertia may be advantageously achieved, e.g., when the lens assembly 200 is used in a pan-tilt-zoom camera application and when the directional plane indicated by the arrow in FIG. 2A corresponds to rotation about a tilt axis.

Although it is advantageous for all rotational axes of a folded light path optical block assembly to coincide with the center of gravity of the optical block, it will also be understood that advantages of the disclosed systems and methods may also be realized when none of the rotational axes of a folded light path optical block assembly correspond with the center of gravity of the optical block, when only one of the rotational axes of the folded light path optical block assembly corresponds with the center of gravity of the optical block, or when an optical block is configured such that one or more rotational axes intersect the plane of the longitudinal axes of the optical block assembly pass near, but do not intersect, the center of gravity of the optical block assembly.

FIG. 3A illustrates a perspective view of optical block assembly 200, showing how bracket 213 may be employed to rotate assembly 200 around tilt axis 260 in the direction indicated by arrow 262 (i.e., rotated within a plane defined by longitudinal axes 222, 224 and 226 of respective first, second and third linear light paths of assembly 200 as described in relation to FIG. 2A). In this embodiment, tilt axis 260 may be characterized as coinciding with the center of gravity of optical block assembly 200, but as not intersecting any of the longitudinal axes 222, 224 or 226 of the linear light paths of optical assembly 200. FIG. 3A also illustrates how yoke assembly 280 may be employed to rotate assembly 200 around pan axis 270 in the direction indicated arrow 272 (i.e., rotated in a plane perpendicular with a plane defined by longitudinal axes 222, 224 and 226 of respective first, second and third linear light paths of assembly 200 as described in relation to FIG. 2A). In this embodiment, pan axis 270 may be characterized as coinciding with the center of gravity of optical block assembly 200 and as intersecting longitudinal axes 222 and 226 of the linear light paths of optical assembly 200. As shown in FIG. 3A, tilt axis 260 and pan axis 270 intersect each other at pivot point 219 coinciding with the center of gravity of assembly 200. In one exemplary embodiment, rotation in the pan axis direction may be, for example, rotation of the assembly about a vertical axis, and rotation in the tilt axis direction may be, for example, rotation of the assembly about a horizontal axis.

Although not illustrated, assembly 200 may alternatively or additionally be rotated about a rotational axis in a plane oriented diagonally with a plane defined by longitudinal axes 222, 224 and 226 of respective first, second and third linear light paths of assembly 200. Furthermore, although a folded light path optical block assembly 200 has been illustrated having tilt and pan axes that intersect at a pivot point 219, it will be understood that it is possible in other embodiments that tilt and pan axes of a given folded light path optical block may not intersect. It will also be understood that the illustrated bracket 213 and yoke 280 are only exemplary embodiments of rotation mechanisms that may be employed to rotate a folded light path optical block assembly in the practice of the disclosed systems and methods, and that any other mechanism/s suitable for rotating an optical block assembly around one or more axes (tilt, pan, diagonal axes, etc.) may be employed. In the practice of the disclosed systems and methods, any suitable actuator may be employed to rotate a folded light path optical block assembly about one or more rotational axes (e.g., pan axis and/or tilt axis). Examples of suitable actuators include, but are not limited to, conventional electric motors and drive assemblies. Other suitable actuators include voice coil servo mechanisms as illustrated and described in concurrently filed U.S. patent application Ser. No., 10/732,195, entitled "ELECTROMAGNETIC CIRCUIT AND SERVO MECHANISM FOR ARTICULATED CAMERAS" by Hovanky et al., (Atty Dkt. COVI:003), which is incorporated herein by reference. Such actuators may be implemented to rotate a folded optical block assembly, for example, in combination with conventional slip ring apparatus. Such actuators may also be implemented with slip ring apparatus described and illustrated in concurrently filed U.S. patent application Ser. No. 10/732,924, entitled "SLIP RING APPARATUS" by Washington, et al. (Atty Dkt. COVI:005).

Figure 3B:
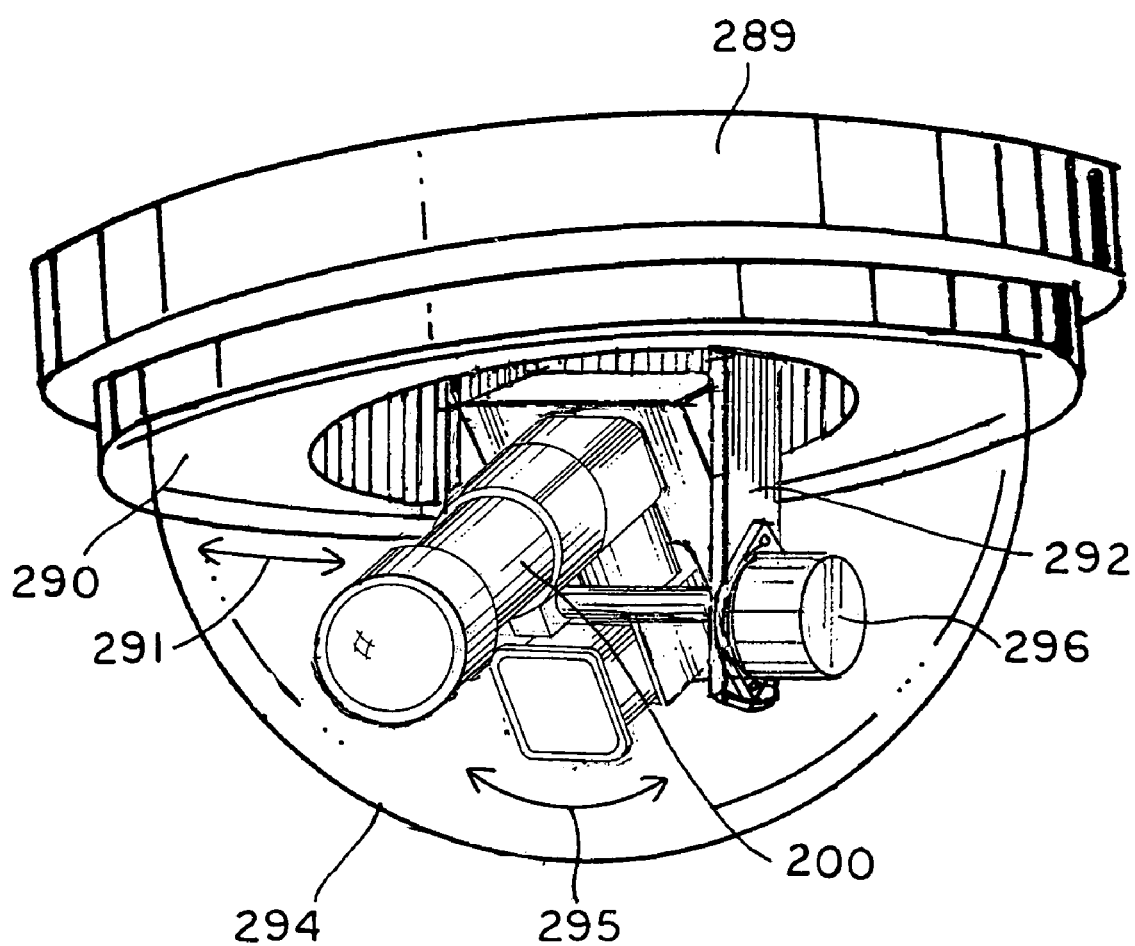
FIG. 3B is a perspective view of a folded light path optical block assembly and semi-spherical dome enclosure assembly according to one exemplary embodiment disclosed herein.

FIG. 3B shows a dual-stage folded light path optical block assembly 200 as it may be configured for rotation within a semi-spherical dome enclosure assembly 290 (e.g., having a domed surface 294 of transparent material). As shown, dome enclosure assembly 290 may include a mounting base 289 (e.g., for mounting to suitable surface such as wall or ceiling of a room under surveillance) In this regard, assembly 200 may be rotatably coupled to yoke assembly 292 or any other suitable rotation mechanism for rotating assembly 200 around one or more axes (e.g., in both tilt and pan axes) within dome assembly 290. Enclosure 290 may include an actuator (e.g., voice coil servo mechanism or other type of suitable motor or servo mechanism not shown) to provide rotation to yoke assembly 292 and optical block assembly 200 in the pan axis direction indicated by arrow 291. Optical block assembly 200 may be provided with zoom and focus lens group assemblies. A yoke-mounted actuator 296 (e.g., voice coil servo mechanism or other type of suitable motor or servo mechanism) is shown coupled to yoke assembly 292 and optical block assembly 200, e.g., as a tilt actuator to provide rotation to optical block assembly 220 in the tilt axis direction indicated by arrow 295.

Although a semi-spherical dome-shaped enclosure assembly is illustrated in FIG. 3B, it will be understood that optical block enclosure assemblies having any other suitable enclosure shape and configuration may also be employed as enclosures for the disclosed folded light path optical block assemblies including, but not limited to, spherical dome or ball-shaped enclosures, square or rectangular enclosures, etc.

In one exemplary embodiment of the disclosed systems and methods, a folded light path optical block assembly may be configured to rotate within a plane defined by longitudinal axes of two or more respective linear light paths of an optical block assembly about a rotational axis that intersects the longitudinal axis of one of the linear light paths of the optical block assembly. For example, optical block assembly 200 may be alternately configured to rotate around a tilt axis (i.e., to rotate within a plane defined by longitudinal axes 222, 224 and 226 of respective first, second and third linear light paths of assembly 200 of FIG. 2A) that intersects one of longitudinal axes 222, 224 or 226 of the linear light paths of optical assembly 200. In this regard, just three possible alternate locations 250, 252 and 254 for center of rotation of optical block 200 in the tilt axis direction are illustrated in FIG. 2A. As shown, alternate locations 250, 252 and 254 intersect linear light path longitudinal axes 222, 224 and 226, respectively.

In the practice of the disclosed systems and methods, when a rotational axis intersects the longitudinal axis of one of the linear light paths of a folded light path optical block assembly, it is considered to intersect a space or area having an outermost periphery defined between light bending points located at the intersection of adjacent longitudinal axes of the linear light paths of the optical block assembly, and the point of intersection of the longitudinal axis of one of the initial linear light paths with the front end of the assembly and the point of intersection of the longitudinal axis of one other of the linear light paths with the back end of the assembly. As illustrated further herein in relation to FIGS. 5-9, an outermost periphery of such a space or area may be characterized as being defined by the outermost periphery that is established by lines extending between each of the light bending points, between each of the light bending points and the point of intersection of the longitudinal axis of one of the initial linear light paths with the front end of the assembly, between each of the light bending points and the point of intersection of the longitudinal axis of one other of the linear light paths with the back end of the assembly, and between the point of intersection of the longitudinal axis of one of the initial linear light paths with the front end of the assembly and the point of intersection of the longitudinal axis of one other of the linear light paths with the back end of the assembly. When a rotational axis intersects the longitudinal axis of one of the linear light paths of the optical block assembly, it is considered to intersect such a space or area.

In one exemplary embodiment, a folded light path optical block may be configured to rotate within a plane defined by longitudinal axes of two or more respective linear light paths of an optical block assembly about a rotational axis that intersects the longitudinal axis of one of the linear light paths of the optical block assembly at a point near, or at a point intersecting the center of gravity of the optical block (i.e., such that the center of gravity of the optical block, the rotational axis of the optical block, and the longitudinal axis of one of the linear light paths all coincide). In this regard, the location of center of gravity of an optical block relative to a given rotational axis and longitudinal axis of a given linear light path may be manipulated by selectively configuring the mass distribution of the optical block and/or by selectively configuring the geometry of the optical block (e.g., number and length of light paths, direction and angle of bends or folds of the light paths, etc.).

Figure 4A:
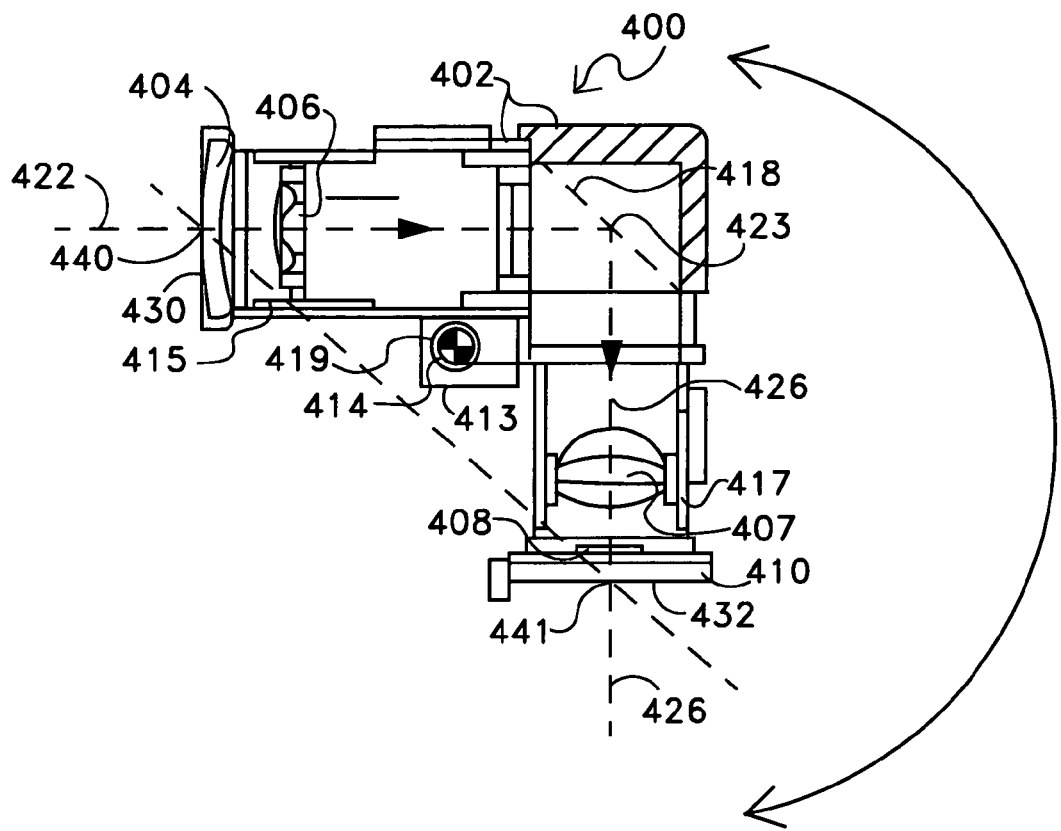
FIG. 4A is a side cross sectional representation of a folded light path optical block assembly according to one exemplary embodiment disclosed herein.
Figure 4B:
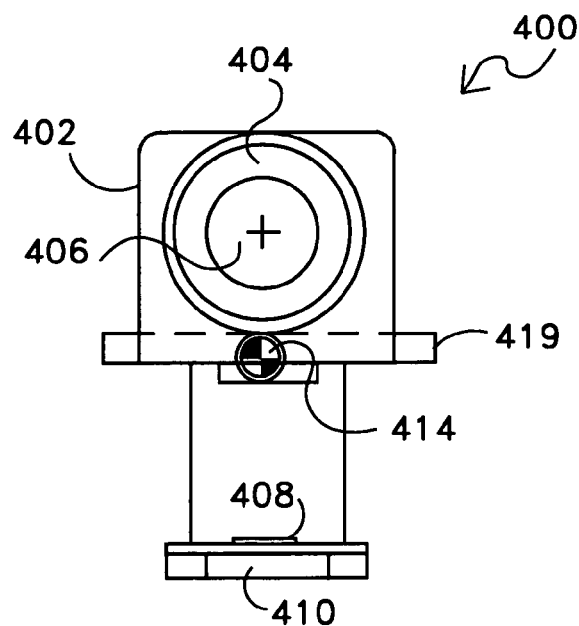
FIG. 4B is a front cross sectional representation of a folded light path optical block assembly according to one exemplary embodiment disclosed herein.

FIGS. 4A and 4B illustrate one exemplary embodiment of a single-stage folded light path optical block assembly 400 having an optical block housing 402 that maintains in operative relationship a single 90-degree reflecting prism 418, a movable zoom lens assembly 406, a movable focus lens assembly 407 and image sensor board assembly 410. A light or image gathering lens 404 is configured to provide a first and initial linear light path defined between light gathering lens 444 at front end 430 of assembly 400 and 90-degree reflecting prism 418. As shown, the first and initial linear light path of assembly 400 extends through zoom lens assembly 406 and has a longitudinal axis 422. A single stage folded light path is provided by 90-degree reflecting prism 418 that is configured to provide a second and terminal linear light path between first 90-degree reflecting prism 218 and image sensor 408 positioned at back end 432 of assembly 400. As shown, the second and terminal linear light path of assembly 400 extends through focus lens assembly 407 and has a longitudinal axis 426. Also shown is lens drive mechanism 415 configured to actuate zoom lens assembly 406, and lens drive mechanism 417 configured to actuate focus lens assembly 407. Initial and terminal light paths of assembly 400 may be characterized as being disposed in a common plane, and the terminal light path of assembly 400 has a direction that is perpendicular or that is oriented at an angle of about 90 degrees relative to the direction of the initial light path.

Similar to dual-stage folded light path optical block assembly 200 of FIGS. 2A, 2B and 3A, single-stage folded light path optical block assembly 400 of FIGS. 4A and 4B has a center of gravity 414 that is located within an area (i.e., an area of the plane defined by longitudinal axes 422 and 226 of respective first and second linear light paths of assembly 400) having an outermost periphery defined between light bending point 423 (located at the intersection of adjacent longitudinal axes 422 and 426 of linear light paths of assembly 400), and the point of intersection 240 of axis 422 with front end 430 and the point of intersection 441 of axis 426 with back end 432 of assembly 400. As with the dual-stage assembly of FIGS. 2A, 2B and 3, the single-stage assembly of FIGS. 4A-4B may be implemented in one embodiment in a pan-tilt-zoom camera application with a pivot point located at the center of gravity of the assembly as illustrated in FIGS. 4A-4B. In this regard, mounting bracket 413 is shown configured to provide a pivot point 419 that coincides with center of gravity 414 of assembly 400 so that the center of rotation of assembly 400 is located at the center of gravity of the lens assembly. Thus, bracket 413 may be employed to rotate assembly 400 around pivot point 419 in the directional plane indicated by the arrow in FIG. 4A (i.e., rotated within a plane defined by longitudinal axes 442 and 446 of respective first and second linear light paths of assembly 400) so that an optimum minimized angular moment of inertia may be advantageously achieved, e.g., when the lens assembly 400 is used in a pan-tilt-zoom camera application and when the directional plane indicated by the arrow in FIG. 4A corresponds to rotation about a tilt axis. In this regard, bracket 413 may also be optionally employed to pan the assembly 400 at pivot point 419 about a pan axis (i.e., rotated in a plane perpendicular with a plane defined by longitudinal axes 442 and 444 of respective first and second linear light paths of assembly 400), and/or to rotate assembly 400 about a rotational axis in a plane oriented diagonally with a plane defined by longitudinal axes 442 and 444 of respective first and second linear light paths of assembly 400.

Figure 4C:
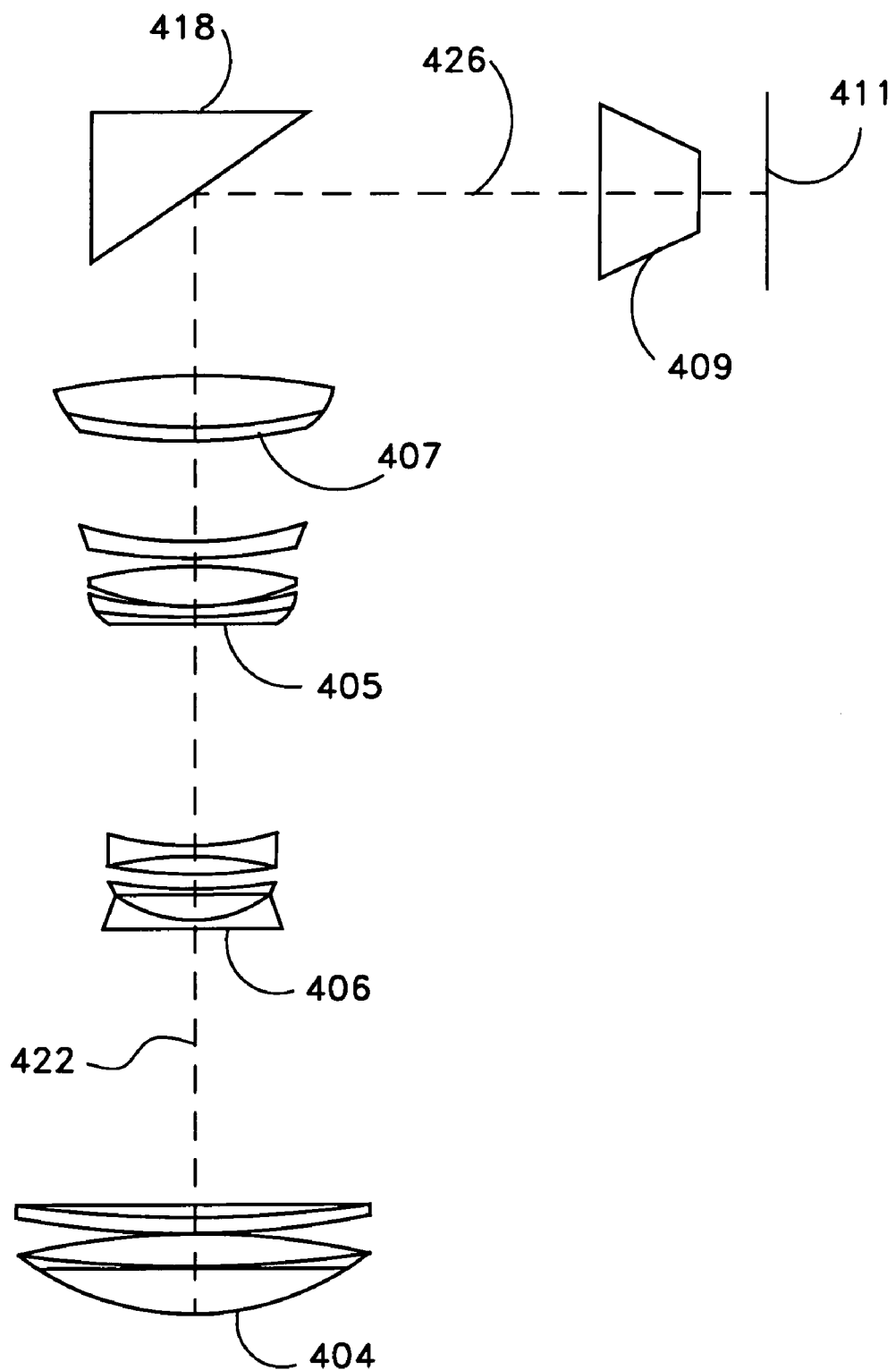
FIG. 4C is an exploded representational view of the optical components of a folded light path optical block assembly according to one exemplary embodiment disclosed herein.
Figure 5:
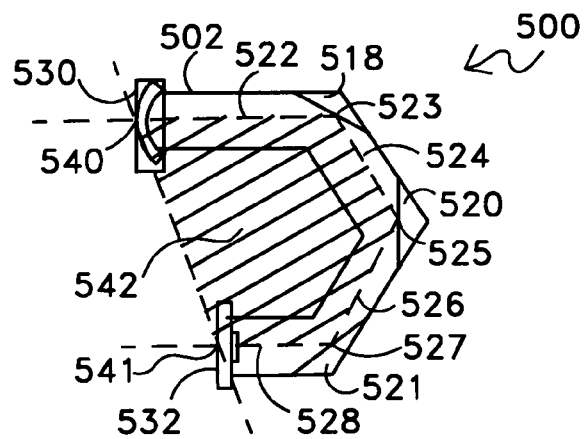
FIG. 5 is a simplified cross sectional representation of a folded light path optical block assembly according to one exemplary embodiment disclosed herein.
Figure 6:
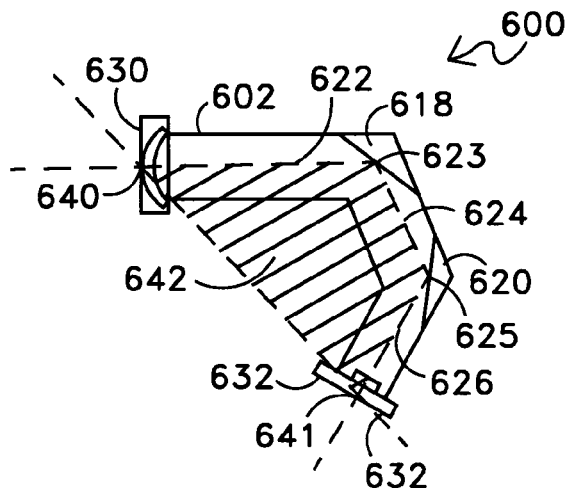
FIG. 6 is a simplified cross sectional representation of a folded light path optical block assembly according to one exemplary embodiment disclosed herein.
Figure 7:
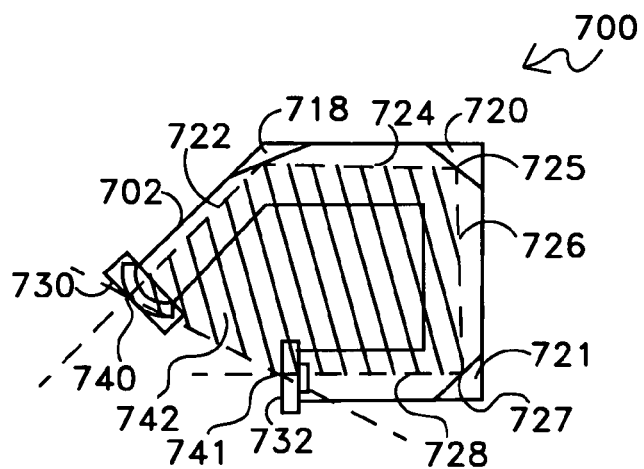
FIG. 7 is a simplified cross sectional representation of a folded light path optical block assembly according to one exemplary embodiment disclosed herein.

It will be understood that the choice between a single stage assembly and a multi-stage assembly, and the choice between a dual stage assembly and an assembly having three or more stages may be based, for example, on requirements of a given application (e.g., the image sensor, zoom and focus specifications, etc.). It will also be understood that the particular configuration and combination of optical block components (number and type of stationary and/or zoom/focus lenses, number and type of lens actuators, optical block housing type, etc.) may vary to fit the needs of a given application. In this regard, FIG. 4C illustrates one alternate and exemplary embodiment of a combination of optical and actuator components as they may be implemented as part of a single-stage folded light path optical block. FIG. 4C shows stationary light gathering lens group 404, movable zoom lens group 406, center stationary lens group 405, movable focus lens group 407, 90-degree reflecting prism 418, rear stationary lens group 409, and image sensor plane 411. Not shown are lens actuator components for the movable lens groups and an optical block housing. It will be understood that an optical block housing may be of any enclosed or open structural configuration suitable for maintaining the optical block components in operative relationship and that lens actuator components may be any mechanism/s suitable for actuating movable lens assemblies in a desired manner (e.g., stepper motor driven lens actuation systems, etc.). Other examples of suitable lens actuator components include those lens actuation mechanisms illustrated and described in concurrently filed U.S. patent application Ser. No. 10/732,740, entitled "SYSTEMS AND METHODS FOR ACTUATING LENS ASSEMBLIES" by Hovanky (Atty Dkt. COVI:004), which is incorporated herein by reference. Types, quality and number of optical lens components for each movable or stationary lens group employed in folded light path optical block assembly may also be selected and configured based on the needs of a given application. Furthermore, although a reflecting prism 418 is shown in FIG. 4, it will be understood that any other suitable light bending component (e.g., mirror, etc.) may be employed to bend or fold the light path as needed for a given configuration of a folded light path optical block assembly.

It will be understood that a folded light path optical block assembly may be configured with any combination and/or configuration of stationary and/or movable components to fit the needs of a given application. For example, as illustrated in FIG. 4C, each of the focus and zoom movable lens group assemblies are positioned between the stationary light gathering lens 404 and prism 418, with a single stationary lens group 409 being positioned between prism 418 and plane 411 of the image sensor. However, in other embodiments a folded light path optical assembly may be configured with only stationary lens components, may be configured with one or more movable zoom lens groups (with no movable focus group), may be configured with one or more movable focus lens groups (with no movable zoom group), may be configured with only movable lens groups, or may be alternately or additionally configured with any other type of movable or stationary lens components (e.g., filter lens group/s, telephoto lens group/s, macro lens group/s, etc.). Furthermore, it will be understood that a folded optical block component may be configured with any type or combination of types of light bending components. In this regard, a light bending component as described herein includes any device suitable for bending light at a desired angle to meet the requirements of a given folded optical block application. Examples of light bending components include, but are not limited to, prisms, mirrors or other reflective and/or refractive optical components suitable for bending light at angles greater than or less than about 90 degrees, etc.

It will be understood that FIGS. 2A-2B, 3A, and 4A-4C only illustrate exemplary embodiments of a respective dual-stage and single stage folded light path optical block assemblies as they may be implemented according to the disclosed systems and methods. In this regard, an assembly pivot point (e.g., intersection of tilt and pivot point axes of a PTZ camera) may be provided that is located at a position that is other than the center of gravity of the assembly. For example, in one embodiment, a folded light path optical block assembly may be configured to rotate within a plane defined by the longitudinal axes of multiple respective linear light paths (i.e., initial, intermediate and terminal light paths) of the optical block assembly about a rotational axis that intersects the rotational plane at a point located within an area having an outermost periphery defined between light bending points (located at the intersection of adjacent longitudinal axes of the multiple light paths of the folded light path optical block assembly), and the point of intersection of the axis of the initial linear light path with a front end of the assembly and the point of intersection of the axis of the terminal linear light path with the back end of the assembly, e.g., such as illustrated in FIGS. 2A, 2B and 3A. This is true regardless of whether the center of gravity of the assembly is also located within this so-defined outermost periphery or is located outside this so-defined outermost periphery. In this regard, advantages of a smaller or more compact optical block assembly to fit smaller enclosures may be realized by utilizing the disclosed multi-stage folded optical block assembly, regardless of location of center of gravity and/or center of rotation of the assembly. However, by configuring an optical block assembly with a center of rotation about a rotational axis that is at or near the center of gravity of the optical block assembly, rotational inertia may be advantageously minimized and power consumption requirements for rotating the assembly thereby reduced.

Figure 3C:
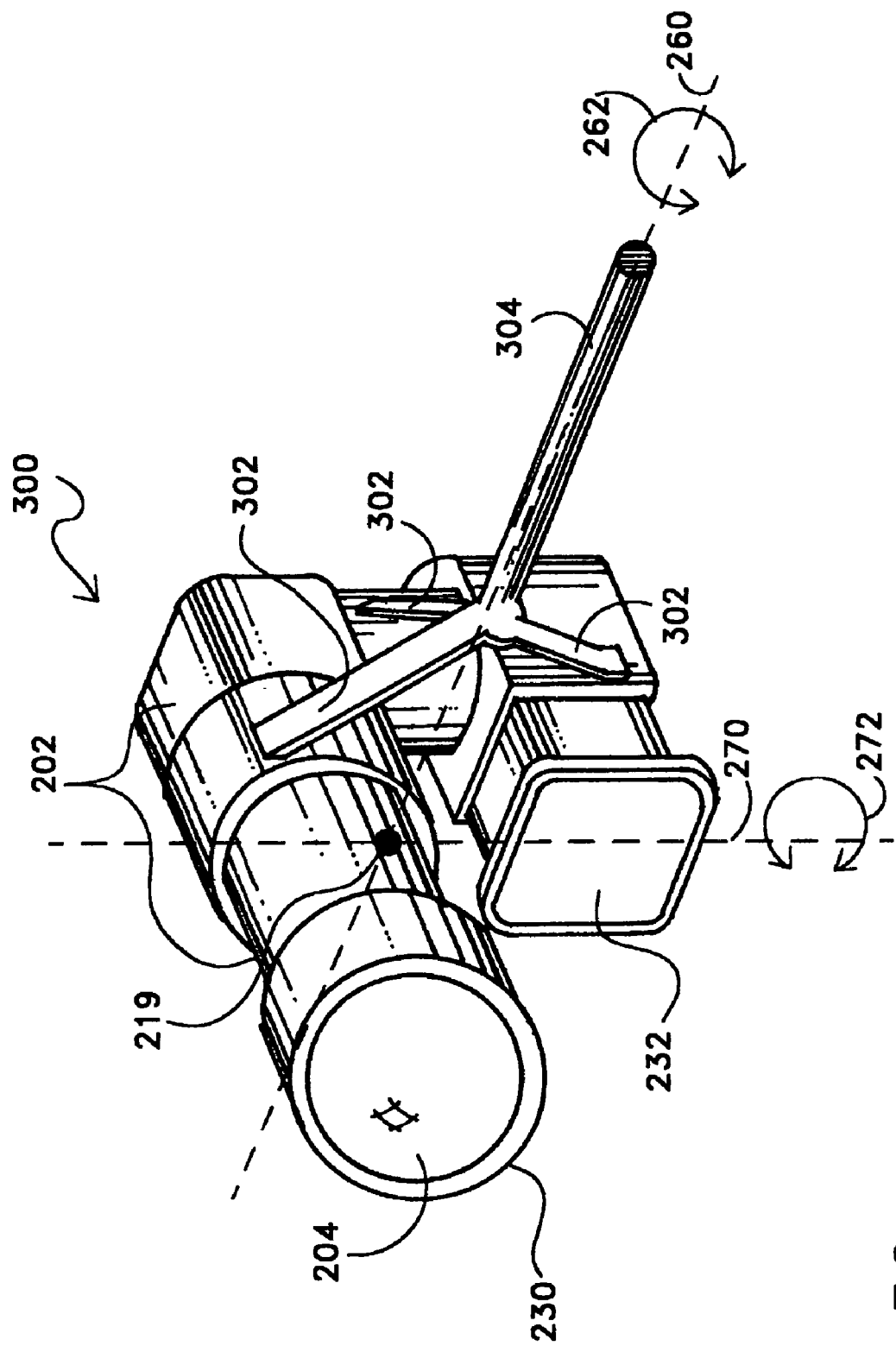
FIG. 3C is a perspective view of a folded light path optical block assembly according to one exemplary embodiment disclosed herein.

It will also be understood that an optical block assembly may be configured to rotate about one or more rotational axes (and optionally configured with a pivot point where these axes intersect) having a location/s that is created by one or more assembly mounting points that are physically coupled to the optical block assembly at locations other than at the physical location of the assembly pivot point. For example, one or more mounting members may be provided to couple a suitable rotational mechanism (e.g., rotating shaft of a drive motor, servo mechanism or drive gearbox) to an optical block assembly to create one or more rotational axes (e.g., pan axis, tilt axis, pan and tilt axis, etc.) for the assembly that do coincide with the physical location of the attachment points of the member/s to the optical block assembly. In such an embodiment, the mounting members may be characterized as being attached to the optical block assembly at a point other than at the effective rotational axis of the assembly. FIG. 3C illustrates a perspective view of one exemplary embodiment of a multiple stage folded light path optical block assembly 300 having three mounting members 302 that couple a rotatable shaft 304 to housing 202 of the assembly, creating an effective assembly pivot point 219 that coincides with the intersection of pan axis 270 and tilt axis 260, but not with the physical location of the attachment points of the members 302 to housing 202. In this regard, FIG. 3C is exemplary only, and any other mounting configuration may be employed (e.g., using different number, type and/or configuration of mounting members) that is suitable for creating an effective pivot point or center of rotation for an optical block assembly.

FIGS. 5-7 and 9 are simplified illustrations showing various alternate and exemplary embodiments of multi-stage optical block configurations as they may be implemented in the practice of the disclosed systems and methods. As shown by these figures, an optical block assembly may be configured to have three or more folded light path stages, and/or may be configured with two or more light bending components, e.g., prisms, mirrors or other reflective and/or refractive optical components suitable for bending light at angles greater than or less than about 90 degrees, etc. In this regard, each of FIGS. 5-7 and 9 respectively illustrate optical block assemblies 500, 600, 700 and 900 with each respective assembly including three or more linear light paths having respective longitudinal axes (i.e., longitudinal axes 522, 524, 526, 528 for assembly 500; longitudinal axes 622, 624, 626 for assembly 600; longitudinal axes 722, 724, 726, 728 for assembly 700; and longitudinal axes 922, 924, 926 for assembly 900). As shown in each of FIGS. 5-7 and 9, the light bending points (i.e., points 523, 525, 527 of assembly 500; points 623 and 625 of assembly 600; points 723, 725, 727 of assembly 700; and points 923 and 925 of assembly 900) in combination with point of intersection (i.e., points 540, 640, 740, 940) of the axis (i.e., 522, 622, 722, 922) of an initial linear light path with the front end (i.e., 530, 630, 730, 930) of the respective assembly and the point of intersection (i.e., points 541, 641, 741, 941) of an axis (i.e., 526, 626, 726, 926) of a terminal linear light path with the back end (i.e., 532, 632, 732, 932) of the respective assembly together form an outermost periphery of a respective area 542, 642, 742 and 942 (shown in cross hatch) of the plane defined by the linear axes of the linear light paths of the assembly within which a center of gravity and/or rotational axis intersection point may be provided.

Figure 8:
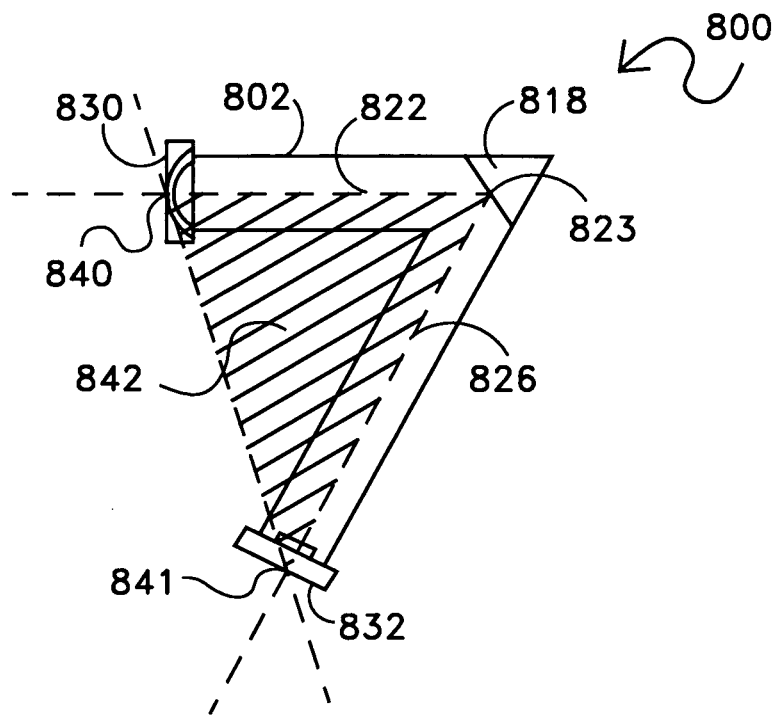
FIG. 8 is a simplified cross sectional representation of a folded light path optical block assembly according to one exemplary embodiment disclosed herein.
Figure 9:
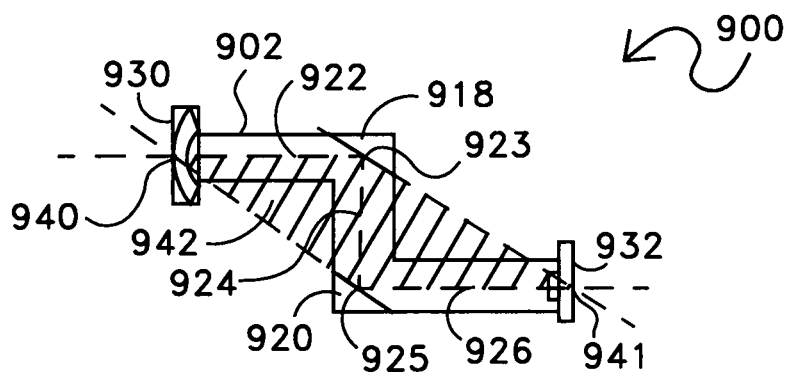
FIG. 9 is a simplified cross sectional representation of a folded light path optical block assembly according to one exemplary embodiment disclosed herein.

FIG. 8 is a simplified illustration showing one alternate and exemplary embodiment of a single-stage optical block configurations as it may be implemented in the practice of the disclosed systems and methods. As shown in FIG. 8, an optical block assembly may be configured to have a single folded light path stage with one or more prisms, mirrors or other reflective and/or refractive optical components suitable for bending light at an angle greater than or less than about 90 degrees. In this regard, FIG. 8 illustrates an optical block assembly 800 including two linear light paths, i.e., initial and terminal linear light paths, having respective longitudinal axes 822 and 826. As shown in FIG. 8, the light bending point 823 of assembly 800 in combination with the point of intersection 840 of axis 822 of the initial linear light path with the front end 830 of assembly 800 and the point of intersection 841 of axis 826 of the terminal linear light path with the back end 832 of assembly 800 together form an outermost periphery of a respective area 842 (shown in cross hatch) of the plane defined by the linear axes of the linear light paths 822 and 826 of the assembly within which a center of gravity and/or rotational axis intersection point may be provided.

Each of FIGS. 5-9 herein illustrate folded light path optical assemblies having a light gathering lens, image sensor, and one or more light bending components operatively disposed in a common geometric plane to form multiple linear light paths with longitudinal axes disposed in the same plane. In this regard, each of assemblies 500, 600, 700 and 800 of FIGS. 5-8 may be characterized as having light paths that are disposed in a common plane and that provide an optical path that folds back upon itself. Assembly 900 of FIG. 9 may be characterized as having light paths disposed in a common plane that provide a laterally displaced optical path with a terminal light path that is parallel and co-directional (or oriented in the same direction) with the initial light path. However, it will be understood with benefit of this disclosure that folded light path optical assemblies of the disclosed systems and methods may be configured to have one or more components operatively disposed in one or more different planes to form one or more linear light paths having longitudinal axes disposed in different plane/s from a plane defined by the longitudinal axes of two or more other linear light paths of the same assembly, e.g., such as may be configured by providing one or more mirrors or prisms that fold or bend light to create a linear light path having a longitudinal axis in a plane that is oriented perpendicular to, or at another angle to, a plane defined by the longitudinal axes of two or more other linear light paths of the same assembly.

For example, in one exemplary embodiment of such a multi-plane folded light path optical block implementation, one or more rotational axes may be provided so that the multi-plane optical assembly may be rotated in one or more different planes. In such an embodiment, the one or more rotational axes may be positioned to intersect or be near the center of gravity, and/or may be positioned to intersect a space having an outermost periphery defined between light bending points located at the intersection of adjacent longitudinal axes of the multiple linear light paths of the assembly, and the point of intersection of the longitudinal axis of the initial linear light path of the assembly with the front end of the assembly and the point of intersection of the longitudinal axis of the terminal linear light path with the back end of the assembly. In another exemplary embodiment of such a multi-plane implementation, a pivot point may be provided at the intersection of two or more rotational axes so that the optical assembly may be rotated within two or more different planes defined by the longitudinal axes of the different linear light paths. In such an embodiment the pivot point may be at or near the center of gravity, and/or may be positioned to intersect a space having an outermost periphery defined between light bending points located at the intersection of adjacent longitudinal axes of the multiple linear light paths of the assembly, and the point of intersection of the longitudinal axis of the initial linear light path of the assembly with the front end of the assembly and the point of intersection of the longitudinal axis of the terminal linear light path with the back end of the assembly. In such an embodiment, the pivot point may be provided for rotating the multi-plane optical block assembly in each of multiple planes, e.g., horizontally and vertically.

Figure 10:
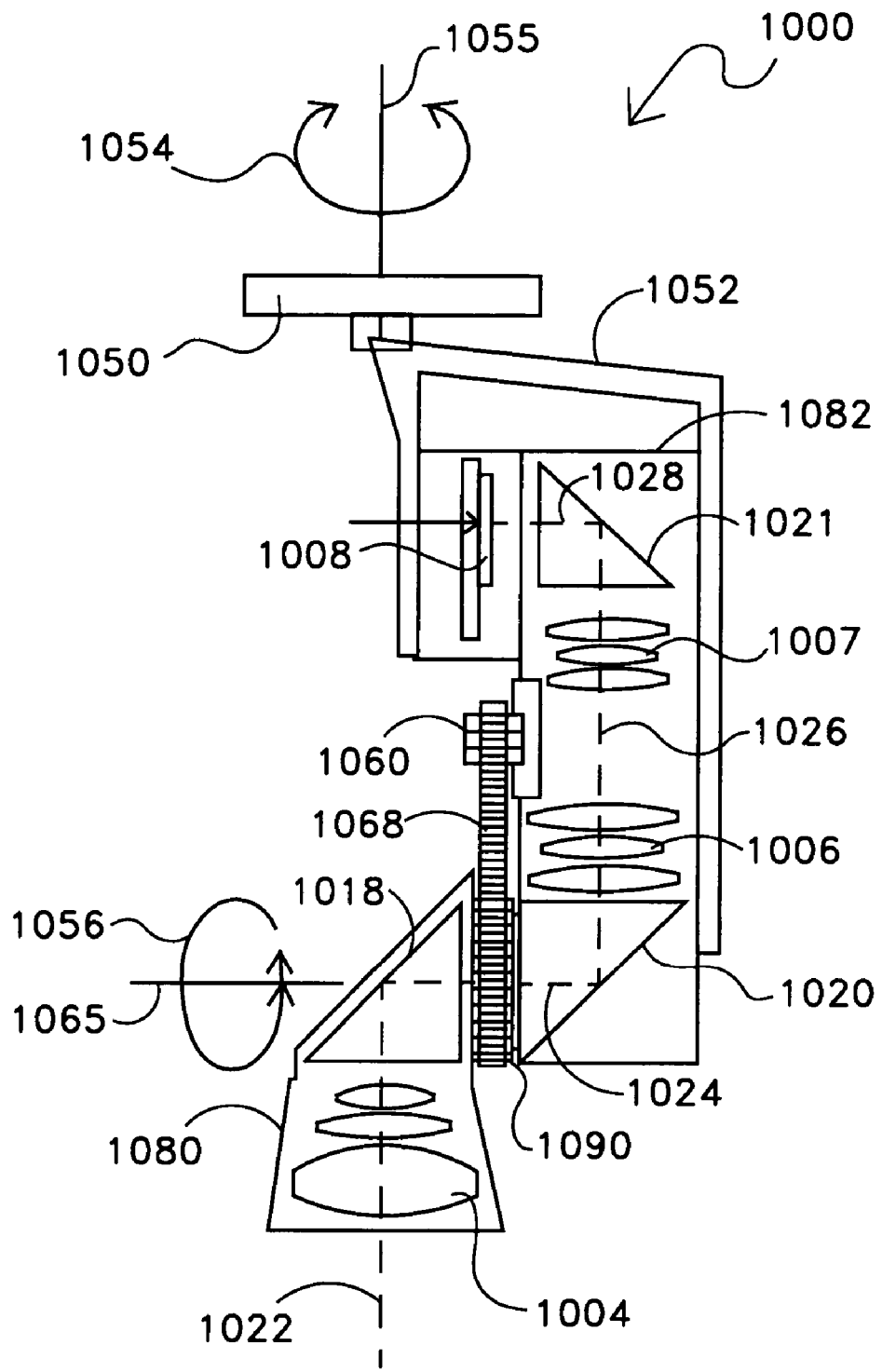
FIG. 10 is a simplified cross sectional representation of a folded light path optical block assembly according to one exemplary embodiment disclosed herein.

FIG. 10 illustrates one exemplary embodiment of a three-stage folded light path optical block assembly 1000 as it may be configured by providing a rotatable light bending component 1025 (e.g. mirror, prism) that is capable of rotating in conjunction with light gathering lens 1004 relative to the remaining light bending components 1020 and 1021 of the optical block assembly. Using this exemplary configuration, light bending component 1025 may be rotated so that it folds or bends light in a way that the initial linear light path of assembly 1000 may have a longitudinal axis 1022 that is variable relative to the fixed longitudinal axes 1024 and 1026 of the intermediate linear light paths and the fixed longitudinal axis 1028 of the terminal longitudinal axes of assembly 1000. As illustrated, light gathering lens 1004 and rotatable light bending component 108 are provided in a rotatable subassembly housing 1080 of optical block assembly 1000 that is rotatably coupled to a main subassembly housing 1082 that includes the remaining light bending components 1020, 1021 and image sensor 1008 of assembly 1000. Also illustrated are zoom lens assembly 1006 and focus lens assembly 1007 that are also included in main subassembly housing 1082. As shown, rotatable subassembly housing 1080 may be rotatably coupled to main subassembly housing 1082 by a rotating bearing interface 1090 (e.g., barrel drive gear or pulley assembly) configured with a central opening or transparent window through which an intermediate light path having a longitudinal axis 1024 may pass between light bending components 1018 and 1024, at the same time that subassembly housing 1080 rotates relative to main subassembly housing 1082. In this regard, rotatable subassembly housing 2080 may be coupled to rotate with rotating bearing interface relative to main subassembly housing 1082.

Still referring to FIG. 10, a first actuator 1050 may be provided for rotating main housing subassembly 1082 and rotatable housing subassembly 1080 together about rotational axis 1065, e.g., in a pan axis direction as indicated by arrow 1054. In this regard, first actuator 1050 may be coupled to the remaining components of assembly 1000 in any suitable manner (e.g., via support bracket 1052 as shown). First actuator 1050 may be, for example, coupled between main housing subassembly 1082 and a stationary base (e.g., such as floor or ceiling of a room in a CCTV surveillance application) so as to impart rotation to main subassembly housing relative to the stationary base. A second actuator 1060 may be provided for rotating rotatable subassembly housing 1080 about rotational axis 1065 relative to main subassembly housing 1082, e.g., in a tilt axis direction as indicated by arrow 1064. In this regard, actuator 1060 may be fixedly coupled to main subassembly housing 1082 and may impart rotational motion to rotatable subassembly housing 1080 via a belt or chain drive mechanism 1068. Using the exemplary embodiment of FIG. 10, rotatable subassembly housing 1080 may be rotated so that light gather lens 1004 faces in a direction to create an initial light path having a longitudinal axis that is oriented perpendicular to, or at another angle to, a plane defined by the longitudinal axes 1024, 1026 and 1028 of the remaining light paths of assembly 1000. For example, longitudinal axes 1024, 1026 and 1028 are shown oriented in the plane of the page in FIG. 10. Rotatable subassembly 1080 is shown positioned in FIG. 10 so that longitudinal axis 1022 lies in the same plane as the plane of longitudinal axes 1024, 1026 and 1028. However, if rotatable subassembly housing 1080 is rotated about rotation axis 1065 so that light gathering lens faces directly outward from the page in FIG. 10, longitudinal axis 1022 of the initial light path will also rotate to be perpendicular to the plane of the page and perpendicular to the plane of longitudinal axes 1024, 1026 and 1028. Other angles between longitudinal axis 1022 and the plane of longitudinal axes 1024, 1026 and 1028 are possible by rotating subassembly housing 1080 to other positions about axis 1065.

Advantageously, the configuration of FIG. 10 may be implemented to allow a smaller dome enclosure for a given sensor and corresponding optic configuration when a tilt axis and associated rotational mechanism is provided closer to the front end of the optical block so as to provide a shorter tilt radius. It will be understood that FIG. 10 is exemplary only, and that other configurations are possible. For example, other types of actuator drive mechanism configurations may be employed, and two or more rotatable subassembly housings may be present. Furthermore, one or more fixed (e.g., non-rotatable mirrors or prisms) may be provided that fold or bend light to create a linear light path having a longitudinal axis in a plane that is oriented perpendicular to, or at another angle to, a plane defined by the longitudinal axes defined by two or more other linear light paths of the same assembly.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed apparatus and methods may be utilized in various combinations and/or independently. Thus the invention is not limited to only those combinations shown herein, but rather may include other combinations.

REFERENCES

The following references, to the extent that they provide exemplary system, apparatus, method, or other details supplementary to those set forth herein, are specifically incorporated herein by reference.

U.S. Provisional patent application serial No. 60/437,713 entitled "Systems And Methods For Location Of Objects", by Richard G. Washington, (attorney docket COVI:002PZ1).

Concurrently filed U.S. patent application Ser. No. 10/732,174 entitled "Systems And Methods For Location Of Objects", by Richard G. Washington, (attorney docket COVI:002).

U.S. Provisional patent application serial No. 60/437,711 entitled "Electromagnetic Circuit And Servo Mechanism For Articulated Cameras", by Thao D. Hovanky, (attorney docket COVI:003PZ1).

Concurrently filed U.S. patent application Ser. No. 10/732,195 entitled "Electromagnetic Circuit And Servo Mechanism For Articulated Cameras", by Thao D. Hovanky et al., (attorney docket COVI:003).

U.S. Provisional patent application serial No. 60/437,710 entitled "Systems And Methods For Actuating Lens Assemblies", by Thao D. Hovanky, (attorney docket COVI:004PZ1).

Concurrently filed U.S. patent application Ser. No. 10/732,740 entitled "Systems And Methods For Actuating Lens Assemblies", by Thao D. Hovanky, (attorney docket COVI:004).

U.S. Provisional patent application serial No. 60/437,712 entitled "Slip Ring Apparatus", by Richard G. Washington and Thao D. Hovanky, (attorney docket COVI:005PZ1).

Concurrently filed U.S. patent application Ser. No. 10/732,924 entitled "Slip Ring Apparatus", by Richard G. Washington and Thao D. Hovanky, (attorney docket COVI:005).

U.S. Provisional patent application serial No. 60/437,709 entitled "Thermoelectric Cooled Imaging Apparatus", by Richard G. Washington and Thao D. Hovanky, (attorney docket COVI:007PZ1).

Concurrently filed U.S. patent application Ser. No. 10/732,192 entitled "Thermally Cooled Imaging Apparatus", by Richard G. Washington and Thao D. Hovanky, (attorney docket COVI:007).

U.S. Provisional patent application serial No. 60/456,294 entitled "Systems And Methods For Creation, Transmission, And Viewing Of Multi-Resolution Video", by Richard G. Washington, (attorney docket COVI:008PZ1).

What is claimed is:

1. An optical block for a closed circuit television camera, comprising a folded light path optical block assembly configured for use in a closed circuit television assembly; wherein said folded light path optical block assembly comprises a light gathering lens at a front end of said optical block assembly and an image sensor at a back end of said optical block assembly; wherein said folded light path optical block assembly is configured to transmit light along two or more linear light paths between said light gathering lens and said image sensor; and wherein said folded light path optical block is configured to rotate about at least one rotational axis, said at least one rotational axis intersecting a space having an outermost periphery defined between light bending points located at the intersection of adjacent longitudinal axes of said linear light paths, and the point of intersection of the longitudinal axis of one of said initial linear light paths with said front end of said assembly and the point of intersection of the longitudinal axis of one other of said linear light paths with said back end of said assembly.

2. The optical block of claim 1, wherein said at least one rotational axis intersects the center of gravity of said folded light path optical block assembly.

3. The optical block of claim 1, wherein said folded light path optical block assembly comprises a light gathering lens at a front end of said optical block assembly and an image sensor at a back end of said optical block assembly; wherein said folded light path optical block assembly is configured to transmit light along two or more linear light paths between said light gathering lens and said image sensor; and wherein said at least one rotational axis intersects the longitudinal axis of at least one of said two or more linear light paths.

4. The optical block of claim 1, wherein said folded light path optical block assembly is dimensionally configured to allow rotation about said rotational axis within a spherical or semi-spherical dome enclosure having a diameter of from about 4 inches to about 10 inches.

5. The optical block of claim 4, wherein said image sensor has a size of greater than or equal to ½ inches.

6. The optical block of claim 1, wherein said folded light path optical block assembly is a single-stage folded light path optical block assembly having a terminal light path that has a direction that is oriented at an angle of about 90 degrees relative to an initial light path of said folded light path optical block assembly.

7. The optical block of claim 1, wherein said folded light path optical block assembly is a multiple-stage folded light path optical block assembly having an optical path that is folded back upon itself.

8. The optical block of claim 1, wherein said folded light path optical block assembly is a dual-stage folded light path optical block assembly having an optical path that is folded back upon itself.

9. The optical block of claim 1, wherein said folded light path optical block assembly is configured to rotate about at least two rotational axes, said at least two rotational axes comprising a pan axis and a tilt axis.

10. The optical block of claim 1, wherein said folded light path optical block assembly is a multi-plane optical block defining an optical path configured in multiple planes.

11. The optical block of claim 1, further comprising at least one light bending component that may be moved relative to at least one other light bending component of said optical block to create a linear light path having a longitudinal axis that is variable relative to a plane defined by the longitudinal axes of two or more other linear light paths of said optical block.

12. The optical block of claim 1, wherein said optical block is rotatable about a pan axis; and wherein said optical block further comprises at least one rotatable light bending component that may be rotated about a tilt axis relative to at least one other light bending component of said optical block to create a linear light path having a longitudinal axis that is variable relative to a plane defined by the longitudinal axes of two or more other linear light paths of said optical block.

13. The optical block of claim 12, wherein said at least one rotatable light bending component is part of a rotatable subassembly housing that is rotatably coupled to a main subassembly housing, said at least one other light bending component being a part of said main subassembly housing; wherein said rotatable subassembly housing further comprises a rotatable light gathering lens; wherein said variable linear light path is a variable initial linear light path between said light gathering lens and said rotatable light bending component; wherein said two or more other linear light paths of said optical block comprise an intermediate linear light bending path and a terminal light bending path; wherein said main subassembly housing comprises an image sensor for receiving said terminal linear light path; and wherein said optical block further comprises an actuator coupled between said main subassembly housing and said rotatable subassembly housing, said actuator configured to rotate said rotatable subassembly housing relative to said main subassembly housing.

14. An optical block for a closed circuit television camera, comprising a folded light path optical block assembly configured for use in a closed circuit television assembly; wherein said folded light path optical block assembly is configured to rotate about at least one rotational axis; wherein said folded light path optical block assembly comprises a light gathering lens at a front end of said optical block assembly and an image sensor at a back end of said optical block assembly; wherein said folded light path optical block assembly is configured to transmit light along two or more linear light paths between said light gathering lens and said image sensor; and wherein said folded light path optical block is configured to rotate about said at least one rotational axis within a plane defined by the longitudinal axes of said two or more linear light paths, said rotational axis intersecting said plane defined by the longitudinal axes of said two or more linear light paths at a point located within an area having an outermost periphery defined between the light bending points located at the intersection of adjacent longitudinal axes of said linear light paths, and by the point of intersection of the longitudinal axis of one of said initial linear light paths with said front end of said assembly and the point of intersection of the longitudinal axis of one other of said linear light paths with said back end of said assembly.

15. The optical block of claim 14, wherein said at least one rotational axis intersects the longitudinal axis of at least one of said two or more linear light paths.

16. An optical block for a closed circuit television camera, comprising a folded light path optical block assembly configured for use in a closed circuit television assembly; wherein said folded light path optical block assembly is configured to rotate about at least one rotational axis; wherein said at least one rotational axis intersects the center of gravity of said folded light path optical block assembly; wherein said folded light path optical block assembly comprises a light gathering lens at a front end of said optical block assembly and an image sensor at a back end of said optical block assembly; wherein said folded light path optical block assembly is configured to transmit light along two or more linear light paths between said light gathering lens and said image sensor; and wherein said folded light path optical block is configured to rotate about said at least one rotational axis within a plane defined by the longitudinal axes of said two or more linear light paths, said rotational axis intersecting said plane defined by the longitudinal axes of said two or more linear light paths at a point located within an area having an outermost periphery defined between the light bending points located at the intersection of adjacent longitudinal axes of said linear light paths, and by the point of intersection of the longitudinal axis of one of said initial linear light paths with said front end of said assembly and the point of intersection of the longitudinal axis of one other of said linear light paths with said back end of said assembly.

17. The optical block of claim 16, wherein said at least one rotational axis intersects the longitudinal axis of at least one of said two or more linear light paths.

18. An optical block for a closed circuit television camera, comprising a folded light path optical block assembly configured for use in a closed circuit television assembly; wherein said folded light path optical block assembly is configured to rotate about at least one rotational axis; wherein said at least one rotational axis intersects the center of gravity of said folded light path optical block assembly; wherein said folded light path optical block assembly is configured to rotate about at least two rotational axes, said at least two rotational axes comprising a pan axis and a tilt axis; and wherein said pan axis intersects said tilt axis of said folded light path optical block assembly at said center of gravity of said folded light path optical block assembly.

19. A closed circuit television apparatus, comprising:
a folded light path optical block assembly, said folded light path optical block assembly comprising:
a light gathering lens at a front end of said optical block assembly, said light gathering lens configured to gather and transmit light along an initial linear light path,
a closed circuit television image sensor at a back end of said optical block assembly, said image sensor configured to receive light transmitted along a terminal linear light path, and
at least one light bending component operatively disposed to form an optical path between said light gathering lens and said image sensor;
wherein said light gathering lens, said image sensor, and said at least one light bending component are disposed in a common geometric plane; and
wherein said folded light path optical block assembly is configured to rotate about at least one rotational axis within said common geometric plane, said at least one rotational axis intersecting a space having an outermost periphery defined between said at least one light bending point, the point of intersection of a longitudinal axis of said initial linear light path with said front end of said assembly and the point of intersection of a longitudinal axis of said terminal linear light path with said back end of said assembly.

20. The apparatus of claim 19, wherein said folded light path optical block assembly is dimensionally configured to allow rotation within said common geometric plane within a spherical or semi-spherical dome enclosure having a diameter of from about 4 inches to about 10 inches.

21. The apparatus of claim 20, wherein said folded light path optical block assembly is configured to rotate about a rotational axis within said common geometric plane; and wherein said rotational axis intersects the center of gravity of said folded light path optical block assembly.

22. The apparatus of claim 21, wherein said rotational axis intersects said optical path between said light gathering lens and said image sensor.

23. The apparatus of claim 21, further comprising at least one zoom lens group and at least one focus lens group operatively disposed in said optical path between said light gathering lens and said image sensor.

24. The apparatus of claim 23, wherein said optical block assembly comprises part of a pan/tilt/zoom mechanism.

25. The apparatus of claim 24, wherein said image sensor has a size of greater than or equal to ½ inches.

26. The apparatus of claim 19, wherein said folded light path optical block assembly is a single-stage folded light path optical block assembly having a terminal light path that has a direction that is oriented at an angle of about 90 degrees relative to an initial light path of said folded light path optical block assembly.

27. The apparatus of claim 19, wherein said folded light path optical block assembly is a multiple-stage folded light path optical block assembly having an optical path that is folded back upon itself.

28. The apparatus of claim 19, wherein said folded light path optical block assembly is a dual-stage folded light path optical block assembly having an optical path that is folded back upon itself.

29. An optical block assembly, comprising:
a light gathering lens disposed at a front end of said assembly, said light gathering lens configured to gather and transmit light along an initial linear light path;
an image sensor disposed at a back end of said assembly, said image sensor configured to receive light transmitted along a terminal linear light path; and one or more light bending components operatively disposed to form an optical path between said light gathering lens and said image sensor, each of said one or more light bending components configured to receive light transmitted along a first linear light path and to transmit said light along a second linear light path having a longitudinal axis that is different than the longitudinal axis of said first linear light path of the same light bending component;

wherein said each of said one or more light bending components forms a respective light bending point within said optical path between said light gathering lens and said image sensor, said one or more light bending components being configured together in operative relationship with said light gathering lens and said image sensor to receive light transmitted from said light gathering lens along said initial linear light path, and to transmit said light along one or more successive linear light paths, said one or more successive linear light paths including said terminal linear light path to said image sensor; and wherein said folded light path optical block is configured to rotate about at least one rotational axis, said at least one rotational axis intersecting a space having an outermost periphery defined between said one or more light bending points, the point of intersection of the longitudinal axis of said initial linear light paths with said front end of said assembly and the point of intersection of the longitudinal axis of said terminal linear light path with said back end of said assembly.

30. The assembly of claim 29, wherein said folded light path optical block is configured to rotate about said at least one rotational axis within a plane defined by the longitudinal axes of said initial and said one or more successive linear light paths, said at least one rotational axis intersecting said plane defined by the longitudinal axes of said initial and said one or more successive light paths at a point located within an area having an outermost periphery defined between said one or more light bending points, and by the point of intersection of the longitudinal axis of said initial linear light paths with said front end of said assembly and the point of intersection of the longitudinal axis of said terminal linear light path with said back end of said assembly.

31. The assembly of claim 30, wherein said optical block assembly has a center of gravity that is located within said area having an outermost periphery defined between said one or more light bending points, and by the point of intersection of the longitudinal axis of said initial linear light paths with said front end of said assembly and the point of intersection of the longitudinal axis of said terminal linear light path with said back end of said assembly.

32. The assembly of claim 31, wherein said at least one rotational axis intersects the center of gravity of said folded light path optical block assembly.

33. The assembly of claim 32, wherein said at least one rotational axis intersects the longitudinal axis of at least one of said initial or successive linear light paths.

34. The assembly of claim 30, wherein said at least one rotational axis intersects the longitudinal axis of at least one of said initial or successive linear light paths.

35. The assembly of claim 30, wherein said optical block assembly comprises a single-stage folded light path optical block assembly having a single light bending component operatively disposed to form a single light bending point within said optical path between said light gathering lens and said image sensor, said single light bending component being configured to receive light transmitted from said light gathering lens along said initial linear light path, and to transmit said light along said terminal linear light path to said image sensor; wherein said folded light path optical block is configured to rotate about said at least one rotational axis within a plane defined by the longitudinal axes of said initial and said terminal linear light paths; and wherein said at least one rotational axis intersects a plane defined by the longitudinal axes of said initial and said terminal light paths at a point located within an area having an outermost periphery defined between said single light bending point, the point of intersection of the longitudinal axis of said initial linear light path with said front end of said assembly and the point of intersection of the longitudinal axis of said terminal linear light path with said back end of said assembly.

36. The assembly of claim 30, wherein said optical block assembly comprises a dual-stage folded light path optical block assembly having first and second light bending components operatively disposed to form respective first and second light bending points within said optical path between said light gathering lens and said image sensor; said first light bending component being configured to receive light transmitted from said light gathering lens along said initial linear light path, and to transmit said light along an intermediate linear light path to said second light bending component; said second light bending component being configured to receive light transmitted from said first light bending component along said intermediate linear light path, and to transmit said light along said terminal linear light path to said image sensor; wherein said folded light path optical block is configured to rotate about said at least one rotational axis within a plane defined by the longitudinal axes of said initial, second and terminal linear light paths; and wherein said at least one rotational axis intersects a plane defined by the longitudinal axes of said initial, second and terminal light paths at a point located within an area having an outermost periphery defined between said first and second light bending points, the point of intersection of the longitudinal axis of said initial linear light path with said front end of said assembly and the point of intersection of the longitudinal axis of said terminal linear light path with said back end of said assembly.

37. The assembly of claim 30, wherein said optical block assembly comprises a multiple-stage folded light path optical block assembly having two or more light bending components operatively disposed to form said optical path between said light gathering lens and said image sensor.

38. The assembly of claim 30, wherein said optical block assembly comprises a closed circuit television camera optical block.

39. The assembly of claim 38, further comprising at least one zoom lens group and at least one focus lens group operatively disposed in said optical path between said light gathering lens and said image sensor.

40. The assembly of claim 38, wherein said optical block assembly comprises part of a pan/tilt/zoom mechanism.

41. The assembly of claim 40, wherein said folded light path optical block assembly is dimensionally configured to allow rotation about said at least one rotational axis within a spherical or semi-spherical dome enclosure having a diameter of from about 4 inches to about 10 inches.

42. The assembly of claim 41, wherein said image sensor has a size of greater than or equal to ½ inches.

43. A method of operating an optical block for a closed circuit television camera, said method comprising providing a folded light path optical block assembly configured for use in a closed circuit television assembly, and rotating said folded light path optical block assembly about at least one rotational axis; wherein said folded light path optical block assembly comprises a light gathering lens at a front end of said optical block assembly and an image sensor at a back end of said optical block assembly; wherein said folded light path optical block assembly is configured to transmit light along two or more linear light paths between said light gathering lens and said image sensor; and wherein said method further comprises rotating said folded light path optical block assembly about at least one rotational axis, said at least one rotational axis intersecting a space having an outermost periphery defined between light bending points located at the intersection of adjacent longitudinal axes of said linear light paths, and by the point of intersection of the longitudinal axis of one of said initial linear light paths with said front end of said assembly and the point of intersection of the longitudinal axis of one other of said linear light paths with said back end of said assembly.

44. The method of claim 43, wherein said at least one rotational axis intersects the center of gravity of said folded light path optical block assembly.

45. The method of claim 43, wherein said folded light path optical block assembly comprises a light gathering lens at a front end of said optical block assembly and an image sensor at a back end of said optical block assembly; wherein said folded light path optical block assembly is configured to transmit light along two or more linear light paths between said light gathering lens and said image sensor; and wherein said at least one rotational axis intersects the longitudinal axis of at least one of said two or more linear light paths.

46. The method of claim 43, wherein said folded light path optical block assembly is dimensionally configured to allow rotation about said rotational axis within a spherical or semi-spherical dome enclosure having a diameter of from about 4 inches to about 10 inches; and wherein said method further comprises rotating said folded light path optical block assembly within said spherical or semi-spherical dome enclosure.

47. The method of claim 46, wherein said folded light path optical block assembly comprises a light gathering lens at a front end of said optical block assembly and an image sensor at a back end of said optical block assembly; wherein said folded light path optical block assembly is configured to transmit light along two or more linear light paths between said light gathering lens and said image sensor; and wherein said image sensor has a size of greater than or equal to ½ inches.

48. The method of claim 43, wherein said folded light path optical block assembly is a single-stage folded light path optical block assembly having a terminal light path that has a direction that is oriented at an angle of about 90 degrees relative to an initial light path of said folded light path optical block assembly.

49. The method of claim 43, wherein said folded light path optical block assembly is a multiple-stage folded light path optical block assembly having an optical path that is folded back upon itself.

50. The method of claim 43, wherein said folded light path optical block assembly is a dual-stage folded light path optical block assembly having an optical path that is folded back upon itself.

51. A method of operating an optical block for a closed circuit television camera, said method comprising providing a folded light path optical block assembly configured for use in a closed circuit television assembly, and rotating said folded light path optical block assembly about at least one rotational axis; wherein said folded light path optical block assembly comprises a light gathering lens at a front end of said optical block assembly and an image sensor at a back end of said optical block assembly; wherein said folded light path optical block assembly is configured to transmit light along two or more linear light paths between said light gathering lens and said image sensor; and wherein said method further comprises rotating said folded light path optical block about said at least one rotational axis within a plane defined by the longitudinal axes of said two or more linear light paths, said rotational axis intersecting said plane defined by the longitudinal axes of said two or more linear light paths at a point located within an area having an outermost periphery defined between the light bending points located at the intersection of adjacent longitudinal axes of said linear light paths, and by the point of intersection of the longitudinal axis of one of said initial linear light paths with said front end of said assembly and the point of intersection of the longitudinal axis of one other of said linear light paths with said back end of said assembly.

52. The method of claim 51, wherein said at least one rotational axis intersects the longitudinal axis of at least one of said two or more linear light paths.

53. A method of operating an optical block for a closed circuit television camera, said method comprising providing a folded light path optical block assembly configured for use in a closed circuit television assembly, and rotating said folded light path optical block assembly about at least one rotational axis; wherein said at least one rotational axis intersects the center of gravity of said folded light path optical block assembly; wherein said folded light path optical block assembly comprises a light gathering lens at a front end of said optical block assembly and an image sensor at a back end of said optical block assembly; wherein said folded light path optical block assembly is configured to transmit light along two or more linear light paths between said light gathering lens and said image sensor; and wherein said method further comprises rotating said folded light path optical block about said at least one rotational axis within a plane defined by the longitudinal axes of said two or more linear light paths, said rotational axis intersecting said plane defined by the longitudinal axes of said two or more linear light paths at a point located within an area having an outermost periphery defined between the light bending points located at the intersection of adjacent longitudinal axes of said linear light paths, and by the point of intersection of the longitudinal axis of one of said initial linear light paths with said front end of said assembly and the point of intersection of the longitudinal axis of one other of said linear light paths with said back end of said assembly.

54. The method of claim 53, wherein said at least one rotational axis intersects the longitudinal axis of at least one of said two or more linear light paths.

55. A method of operating an optical block assembly, comprising:
    providing an optical block assembly comprising the following components:
        a light gathering lens disposed at a front end of said assembly, said light gathering lens configured to gather and transmit light along an initial linear light path;
        an image sensor disposed at a back end of said assembly, said image sensor configured to receive light transmitted along a terminal linear light path; and
        one or more light bending components operatively disposed to form an optical path between said light gathering lens and said image sensor, each of said one or more light bending components configured to receive light transmitted along a first linear light path and to transmit said light along a second linear light path having a longitudinal axis that is different than the longitudinal axis of said first linear light path of the same light bending component;

wherein each of said one or more light bending components forms a respective light bending point within said optical path between said light gathering lens and said image sensor, said one or more light bending components being configured together in operative relationship with said light gathering lens and said image sensor to receive light transmitted from said light gathering lens along said initial linear light path, and to transmit said light along one or more successive linear light paths, said one or more successive linear light paths including said terminal linear light path to said image sensor; and rotating said optical block assembly about at least one rotational axis, said at least one rotational axis intersecting a space having an outermost periphery defined between said one or more light bending points, the point of intersection of the longitudinal axis of said initial linear light paths with said front end of said assembly and the point of intersection of the longitudinal axis of said terminal linear light path with said back end of said assembly.

56. The method of claim 55, wherein said method further comprises rotating said optical block assembly about said at least one rotational axis within a plane defined by the longitudinal axes of said initial and said one or more successive linear light paths, said at least one rotational axis intersecting said plane defined by the longitudinal axes of said initial and said one or more successive light paths at a point located within an area having an outermost periphery defined between said one or more light bending points, and by the point of intersection of the longitudinal axis of said initial linear light paths with said front end of said assembly and the point of intersection of the longitudinal axis of said terminal linear light path with said back end of said assembly.

57. The method of claim 56, wherein said optical block assembly has a center of gravity that is located within said area having an outermost periphery defined between said one or more light bending points, and by the point of intersection of the longitudinal axis of said initial linear light paths with said front end of said assembly and the point of intersection of the longitudinal axis of said terminal linear light path with said back end of said assembly.

58. The method of claim 57, wherein said at least one rotational axis intersects the center of gravity of said folded light path optical block assembly.

59. The method of claim 58, wherein said at least one rotational axis intersects the longitudinal axis of at least one of said initial or successive linear light paths.

60. The method of claim 56, wherein said at least one rotational axis intersects the longitudinal axis of at least one of said initial or successive linear light paths.

* * * * *

UNITED STATES PATENT AND TRADEMARK OFFICE
CERTIFICATE OF CORRECTION

PATENT NO. : 7,583,289 B2
APPLICATION NO. : 10/732193
DATED : September 1, 2009
INVENTOR(S) : Hovanky et al.

It is certified that error appears in the above-identified patent and that said Letters Patent is hereby corrected as shown below:

On the Title Pg, On Page 2, Item (56), under "OTHER PUBLICATIONS", Line 3, delete "http:/www." and insert -- http://www. --, therefor.

On the Title Pg, On Page 2, Item (56), under "OTHER PUBLICATIONS", Line 6, delete "http:/www." and insert -- http://www. --, therefor.

On the Title Pg, On Page 2, Item (56), under "OTHER PUBLICATIONS", Line 9, delete "http:/www." and insert -- http://www. --, therefor.

On the Title Pg, On Page 2, Item (56), under "OTHER PUBLICATIONS", Line 12, delete "http:/www." and insert -- http://www. --, therefor.

On the Title Pg, On Page 2, Item (56), under "OTHER PUBLICATIONS", Line 15, delete "http:/www." and insert -- http://www. --, therefor.

On the Title Pg, On Page 2, Item (56), under "OTHER PUBLICATIONS", Lines 18-19, delete "http:/www." and insert -- http://www. --, therefor.

In Column 1, Line 15, delete "("CCTV)" and insert -- ("CCTV")--, therefor.

In Column 2, Line 55, delete "$1280 \times 10^{24}$" and insert -- $1280 \times 1024$ --, therefor.

In Column 7, Line 20, after "et al.," delete "(Atty Dkt. COVI:003),".

In Column 7, Line 27, after "et al." delete "(Atty Dkt. COVI:005).".

In Column 7, Line 34, delete "surveillance)" and insert -- surveillance). --, therefor.

In Column 10, Line 13, delete "Hovanky (Atty Dkt. COVI:004)," and insert -- Hovanky, --, therefor.

In Column 14, Line 63, delete "Washington, (attorney docket COVI:002PZ1)" and insert -- Washington. --, therefor.

In Column 14, Lines 66-67, delete "Washington, (attorney docket COVI:002)." and insert -- Washington. --, therefor.

In Column 15, Lines 3-4, delete "Hovanky, (attorney docket COVI:003PZ1)." and insert -- Hovanky. --, therefor.

In Column 15, Lines 7-8, delete "et al., (attorney docket COVI:003)." and insert -- et al. --, therefor.

In Column 15, Lines 11-12, delete "Hovanky, (attorney docket COVI:004PZ1)." and insert -- Hovanky. --, therefor.

In Column 15, Lines 15-16, delete "Hovanky, (attorney docket COVI:004)." and insert -- Hovanky. --, therefor.

In Column 15, Line 19, delete "Hovanky, (attorney docket COVI:005PZ1)." and insert -- Hovanky. --, therefor.

In Column 15, Line 22, delete "Hovanky, (attorney docket COVI:005)." and insert -- Hovanky. --, therefor.

In Column 15, Lines 25-26, delete "Hovanky, (attorney docket COVI:007PZ1)." and insert -- Hovanky. --, therefor.

In Column 15, Lines 29-30, delete "Hovanky, (attorney docket COVI:007)." and insert -- Hovanky. --, therefor.

In Column 15, Line 34, delete "Washington, (attorney docket COVI:008PZ1)." and insert -- Washington. --, therefor.

Signed and Sealed this

Sixteenth Day of February, 2010

David J. Kappos
*Director of the United States Patent and Trademark Office*